(12) United States Patent
Don et al.

(10) Patent No.: US 10,194,204 B1
(45) Date of Patent: Jan. 29, 2019

(54) SYSTEMS AND METHODS FOR CONTROLLING PLAYBACK OF A MEDIA ASSET BASED ON DELAY OF A SCHEDULED EVENT

(71) Applicant: Rovi Guides, Inc., San Jose, CA (US)

(72) Inventors: Luis Don, Lumberton, NJ (US); David Paul Steed, Pottstown, PA (US); Peter Jason Calvert, Limerick, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/826,319

(22) Filed: Nov. 29, 2017

(51) Int. Cl.
| | |
|---|---|
| *H04N 21/458* | (2011.01) |
| *H04N 21/45* | (2011.01) |
| *H04N 21/235* | (2011.01) |
| *G06Q 10/10* | (2012.01) |
| *H04N 21/472* | (2011.01) |
| *H04N 21/262* | (2011.01) |

(52) U.S. Cl.
CPC ..... *H04N 21/4583* (2013.01); *G06Q 10/1095* (2013.01); *H04N 21/2353* (2013.01); *H04N 21/26241* (2013.01); *H04N 21/4524* (2013.01); *H04N 21/4532* (2013.01); *H04N 21/47202* (2013.01)

(58) Field of Classification Search
CPC ........... H04N 21/4583; H04N 21/2353; H04N 21/26241; H04N 21/4524; H04N 21/4532; H04N 21/47202
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 7,165,098 B1 | 1/2007 | Boyer et al. |
| 7,761,892 B2 | 7/2010 | Ellis et al. |
| 8,046,801 B2 | 10/2011 | Ellis et al. |
| 9,448,685 B1 | 9/2016 | Somin et al. |
| 2002/0174430 A1 | 11/2002 | Ellis et al. |
| 2005/0251827 A1 | 11/2005 | Ellis et al. |
| 2010/0153885 A1 | 6/2010 | Yates |
| 2013/0096813 A1 | 4/2013 | Geffner et al. |

OTHER PUBLICATIONS

International Search Report and Written Opinion for Application No. PCT/US2018/038967, dated Oct. 2, 2018, 13 pages.

*Primary Examiner* — Joshua D Taylor
(74) *Attorney, Agent, or Firm* — Haley Guiliano LLP

(57) ABSTRACT

Systems and methods are provided for controlling playback of a media asset based on whether events are delayed. This may be accomplished by a media guidance application responding to a suspend playback command by determining whether a user is imminently scheduled to attend an event. If the user is imminently scheduled to attend an event, the media guidance application may query an event database to determine a most current start time of the event and compare the most current start time to a start time from the user's profile associated with the event to determine if the event has been delayed. In response to determining the event is delayed, the media guidance application may continue playback of the media asset notwithstanding the suspend command.

18 Claims, 18 Drawing Sheets

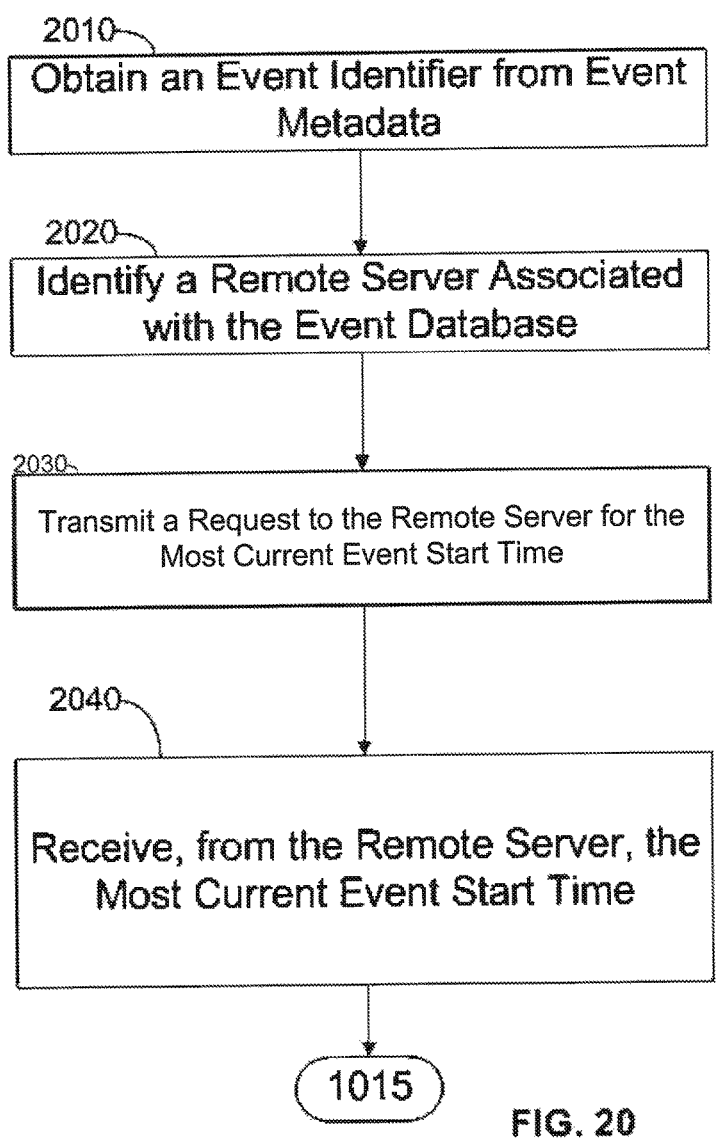

SYSTEMS AND METHODS FOR CONTROLLING PLAYBACK OF A MEDIA ASSET BASED ON DELAY OF A SCHEDULED EVENT

BACKGROUND

Users often consume media while waiting to attend events from their calendar. For example, a user may watch an episode of a show from a streaming service before attending a business dinner at a restaurant. Systems exist that may detect that other attendees to an event will be delayed and reschedule the event. But those systems do not provide the benefit of controlling playback of a media asset based on that delay. As described above, conventional systems may reschedule an event to account for tardy attendees but this is inefficient as the systems do not provide a mechanism to allow the user to automatically continue to play back media when the user has additional time. For example, as the start time for an event approaches, the user may suspend playback of the media in anticipation of travelling to the event; perhaps the user will travel without yet knowing the event was delayed. The user may press pause when a reminder for a business dinner displays on the user's mobile device. However, if the event has been delayed and the user has more time to continue consuming media then playback does not yet need to be suspended.

SUMMARY

Accordingly, systems and methods are provided herein for controlling playback of a media asset on a user equipment device based on indicia that a next event is delayed from an event start time. For example, a media guidance application may detect that a user has requested to pause playback of a media asset being streamed from a media content source, such as an on-demand video streaming service. As an example, it is possible that the user was motivated to request that the playback be paused because a calendar reminder has informed the user that a dinner meeting is approaching. Thus, the media guidance application may, when the pause is requested, determine whether the user's profile has a calendar entry corresponding to a meeting that is imminent. For example, the media guidance application may determine that the command to pause playback occurs close in time to a meeting from the user's calendar and infer that the user intends to pause playback in anticipation of that meeting. In another embodiment, the media guidance application may respond to an audible alert by correlating the audible alert with an upcoming event. Using this correlation, the media guidance application may infer that a pause command received close in time to the audible alert is in anticipation of the upcoming meeting. In response to determining the suspend command, e.g., a pause command, was received close in time to a schedule event, the media guidance application may determine whether the originally scheduled start time of the meeting is delayed, if the schedule start time was delayed, the media guidance application may determine that the user has additional time to continue watching the episode before the delayed start time of the meeting, and the media guidance application may therefore continue playback of the media asset despite receiving a command from the user to suspend playback of the media asset.

The systems and methods described herein may be implemented by a media guidance application made available on a user equipment device. The media guidance application may receive a suspend command during playback of a media asset that has remaining runtime, and the suspend command may indicate that the playback of the media asset should be suspended. In some aspects of the disclosure, the media guidance application may intercept the suspend command or otherwise receive the suspend command. The media guidance application may respond to the suspend command by determining whether a user watching the playback of the media asset is imminently scheduled to attend an event, e.g., a meeting.

In some embodiments, to determine whether the user is imminently scheduled to attend an event, the media guidance application may retrieve a profile corresponding to the user from a database. For example, the media guidance application may access the user's calendar stored in an electronic format (e.g., in Microsoft Outlook ("Microsoft" and "Outlook" are registered trademarks of Microsoft Corporation), which is a popular software application used to manage email and calendar information). In other embodiments, the media guidance application may obtain portions of the profile from across a collection of several databases. For example, the media guidance application may obtain the user's personal calendar from one database (e.g., in a calendar associated with a mobile device), may obtain a joint calendar the user shares with friends or family from a cloud-based calendar database (e.g., in association with a free web-based service like Google Calendar), and/or may obtain the user's professional calendar from a server associated with the user's employer. The media guidance application may combine entries from each calendar to form the profile corresponding to the user. Using the profile corresponding to the user, the media guidance application may determine the next event the user is scheduled to attend from among many events associated with the user. The media guidance application may use this information to determine the event start time of the next event. For example, the media guidance application may access a list of event names and associated start times from the user's profile, and the media guidance application may select the most recent but not yet passed event as the next event and extract the start time associated with the next event from the profile.

In some embodiments, the media guidance application may determine the next event from the user's calendar information and the calendar information may contain both meetings and reminders unrelated to meetings (e.g., a reminder to buy a birthday gift). It may be advantageous to discern meetings from events. Therefore, the media guidance application may obtain a plurality of entries from the calendar information in the user's profile and analyze the plurality of entries to identify a plurality of meetings. The media guidance application may analyze the plurality of meetings to obtain a plurality of meeting start times associated with the plurality of meetings. The media guidance application may then identify the next event from the plurality of meetings based on the plurality of meeting start times. For example, the media guidance application may determine that a user's profile contains three events in the calendar information: a reminder to purchase a birthday gift, a dinner meeting for 7:30 PM on the current day, and a movie date for the next day at 5:00 PM. The media guidance application may use metadata about the events (e.g., locations, start times, end times, durations, notes) to determine which among the events is a meeting and which meeting occurs next in time. In this example, the dinner meeting at 7:30 PM is the next meeting, and the media guidance application would, therefore, identify this event as the next event.

In some embodiments, the media guidance application, when determining whether the user is imminently scheduled to attend an event, may compare the event start time of the next event to the current time and compute the amount of time left before the next event starts. The media guidance application may then compare the amount of time left with an imminence threshold. For example, the media guidance application may consider an event imminent if the event has an event start time within five minutes of the current time. In some embodiments, the media guidance application may be hard coded with an imminence threshold. In some embodiments, the imminence threshold may be determined by the media guidance application based on an estimated location of a user. For example, the media guidance application may access a location application associated with the user to receive the user's current location. The media guidance application may estimate the time it would take the user to arrive at a location associated with the event from the user's current location, and base the imminence time on the estimated travel time. In other embodiments, the media guidance application may store a modifiable imminence threshold to indicate how close in time an event must be to be considered imminent. The media guidance application may also retrieve an imminence threshold from an external source; e.g., a user profile stored on a remote server may contain the imminence threshold. Further, the media guidance application may allow the user to configure the imminence threshold, e.g., the media guidance application may provide a user interface for setting the imminence threshold.

In some embodiments, the media guidance application may consider an event imminent when the start of the event occurs within a time period less than the imminence threshold. The media guidance application may respond to determining that the user is imminently scheduled to attend an event by determining whether the start time of the next event has been delayed. For example, the media guidance application may retrieve details of a meeting in the user's personal calendar stored on a mobile device. The media guidance application may find that the same meeting is associated with an entry in the user's professional calendar stored on a server associated with the user's employer. The media guidance application may determine that the event has been updated in the user's professional calendar with a start time later than the start time in the user's personal calendar. Therefore, the media guidance application may consider the event may be delayed.

In some embodiments, the media guidance application may determine the most current start time of the event was delayed by first determining an identity of an event database associated with the next event. For example, the media guidance application may identify that a meeting is associated with a database on an employer's server. Using the identity of the event database, the media guidance application may query the event database to determine whether the start time of the event was updated and determine the most current event start time. The media guidance application may then compare the most current event start time of the next event to the start time of the next event that was obtained from the user's profile. For example, the media guidance application may compare the start time of the event as stored in the user's personal calendar to the start time of the same event as stored on the employer's server. The media guidance application may then determine that the event has been delayed when the most current event start time is later than the event start time from the user's profile.

In some embodiments, the media guidance application may determine the identity of the event database associated with the next event using information about the next event. The media guidance application may obtain event metadata associated with the next event. For example, the media guidance application may use calendar information stored in the user's profile to obtain information about the next event (e.g., location, start time, end time, duration, attendees, notes, associated websites, associated service providers, event origin, associate accounts). The media guidance application may determine an event database indicator based on the event metadata and identify the event database associated with the next event based on the event database indicator. For example, the media guidance application may determine that the next event is a dinner meeting associated with the user's work email address, and the media guidance application may determine that the event database is the employer's Microsoft Exchange server, a popular corporate email and calendaring server. In another example, the media guidance application may determine the next event is a concert associated with a ticket provider, such as Ticketmaster, and determine that the event database is a web service associated with the ticket provider.

In some embodiments, the media guidance application queries a remote server (e.g., a server that resides on another computer, another network, or at another geographic location) to obtain updated information about the next event. The media guidance application may obtain an event identifier from the event metadata. For example, the media guidance application may use metadata associated with the next event to obtain a unique identifier (UID), a globally unique identifier (GUID), a universally unique identifier (UUID), or a unique string of characters to identify an entry in a database containing information about the next event. The media guidance application may identify a remote server associated with the event database and obtain updated event information from the remote server. For example, the media guidance application may identify a web service at app.ticketmaster.com when the next event is a concert associated with Ticketmaster, and the media guidance application may use that web service to retrieve details of the next event including the most current event start time. The media guidance application may transmit a request to the remote server, the request comprising the event identifier and a command requesting the most current event start time from the event database. The media guidance application may receive, in response from the remote server, the most current event start time. For example, the media guidance application may contact a web service using JavaScript Object Notation (JSON) formatted requests to obtain information about events. In response, the media guidance application may receive event details, in response to requests, including: name, type, ID, uniform resource location, locale, postal code, time zone, address, latitude and longitude, start time, duration, end time, associate images, or other pertinent details from the web service. In this example, the media guidance application may use a published web service to obtain the most current event start time for the next event from the service provider of that event.

In some embodiments, the media guidance application may determine whether the next event is an outdoor event, e.g., a sporting event or concert. For example, the user's calendar entry may be associated with an outdoor venue or may be associated with tickets that indicate, either implicitly or explicitly, that the event is outdoors. In the case where the next event is associated with an outdoor event, the media guidance application may analyze weather reports associated with the location of the next event to determine whether there exists a likelihood that the outdoor event will be delayed. For example, the media guidance application may determine there is a 51% likelihood that the location of the outdoor event will experience rain near the scheduled start of the next event. The media guidance application may then compare the 51% likelihood against a predicted weather delay threshold to determine whether it is likely the outdoor event will be delayed in response to the weather. In another embodiment, the media guidance application determines additional characteristics of the reported weather for the event location such as expected rain volume, wind speed, temperature, and/or humidity and combines the expected weather characteristics to make the determination of whether the outdoor event is likely to be delayed. One of skill in the art would recognize that in some situations local weather may impact indoor events as well as outdoor events, e.g., severe weather could impact in-door events, and the media guidance application may apply techniques described above to indoor events in a similar manner.

In some embodiments, the media guidance application may determine that the most current event start time is the same as the event start time from the user's profile. The media guidance application may then query the event database as to a plurality of other attendees associated with the next event. The media guidance application may then determine a plurality of expected event arrival times associated with the plurality of other attendees associated with the next event. For example, the media guidance application may access GPS coordinates associated with one or more of the other attendees to determine the other attendees' locations. For example, the media guidance application may query smartphones associated with one or more of the other attendees to obtain the GPS coordinates. Those locations may be compared to the location of the next event and the media guidance application may use that information to determine the expected arrival time for one or more of the other attendees. Using the expected arrival times associated with the other attendees, the media guidance application may infer that an event is delayed. In another embodiment, the locations of the other attendees may be unknown to the media guidance application, but the media guidance application may query from a remote data source the expected arrival times associated with the plurality of other attendees. For example, a system may be in place to periodically query each attendee as to an expected arrival time and update a central data source for distribution to meeting attendees. Such querying could be transparent or interactive with the other attendees. In some embodiments, a security system within a corporate location may use facial recognition to track the locations of a building's occupants. The media guidance application may access such a system to obtain the locations or expected arrival times of a plurality of meeting attendees. The media guidance application may compute a plurality of expected event delay amounts associated with the plurality of other attendees. For example, the media guidance application may subtract each of the plurality of expected event arrival times from the event start time to compute each of the plurality of expected event delay amounts. The media guidance application determines whether one or more of the plurality of expected event delay amounts exceeds an event delay threshold. In response to determining that none of the plurality of expected event delay amounts exceeds the event delay threshold, the media guidance application may determine whether the most current event start time is later than the event start time. In response to determining that one or more of the plurality of expected event delay amounts exceeds the event delay threshold, the media guidance application may update the most current event start time based on the plurality of expected event delay amounts. For example, the media guidance application may determine that three attendees other than the user are attending the next event, which is currently scheduled to start at 6:30 PM. In this example, the media guidance application may determine that the attendees are expected to arrive at the next event at 6:30 PM, 6:40 PM, and 7:30 PM, respectively. Hence, the media guidance application may determine that the expected delay amounts are 0 minutes, 10 minutes, and 60 minutes in this example. In this example, the media guidance application may also determine that the event delay threshold is 30 minutes and, because the 60-minute delay exceeds the event delay threshold, the media guidance application will update the most current event start time to 7:30 PM to account for the delayed attendees.

In some embodiments, the media guidance application responds to determining that the most current event start time is delayed by continuing to generate for display the media asset notwithstanding receipt of the suspend command. For example, the media guidance application receives a suspend command, e.g., a pause command, from the user during playback of an episode of a show and the media guidance application may infer that the user issued the suspend command because of a scheduled meeting, e.g., because the user's personal calendar indicates that a meeting is starting soon. The media guidance application could then determine that the meeting was moved (e.g., from 6:30 PM to 7:30 PM) such that the user has additional time to continue watching play back. Using this determination, the media guidance application can determine to continue play back despite having received a pause command from the user.

In some embodiments, it is advantageous for the media guidance application to prompt the user regarding the change in event start time and provide an option of whether to suspend or continue playback. In this regard, the media guidance application may respond to determining that the most current event start time is delayed by simultaneously displaying to the user (1) information indicating that the most current event start time is later than the event start time and (2) a selectable option for continuing to generate for display the media asset notwithstanding receipt of the suspend command. For example, the media guidance application may display a prompt indicating that a meeting was moved from 6:30 PM to 7:30 PM and ask the user whether the user would like to continue watching an episode of the show. The media guidance application would receive a selection from the user of the selectable option (e.g., "yes, continue watching" or "no, stop watching"). In response to receiving the selection from the user of the selectable option, the media guidance application may then continue to generate for display the media asset notwithstanding receipt of the suspend command per the user's selection.

In some embodiments, it is advantageous for the media guidance application to determine for how long the event was delayed while determining whether to continue playback. In this regard, the media guidance application may respond to determining that the most current event start time is delayed by computing how long the event was delayed, i.e., an event delay amount. The media guidance application may, for example, compare the most current event start time to the event start time to compute the event delay amount. The media guidance application may determine whether the event delay amount exceeds an event delay threshold. For example, if a dinner meeting on the user's calendar was delayed five minutes from the event start time stored in the user's personal calendar, the media guidance application may consider this delay too little to continue playback. In such an example, the event delay threshold may be thirty minutes and the event delay must meet, or exceed, thirty minutes for the media guidance application to continue playback. In some embodiments, the media guidance application may be hard coded with an event delay threshold. In other embodiments, the media guidance application may store a modifiable event delay threshold to indicate how long in time an event must be delayed for the media guidance application to continue playback despite receiving the suspend command. The media guidance application may also retrieve an event delay threshold from an external source; e.g., a user profile stored on a remote server may contain the event delay threshold. Further, the media guidance application may allow the user to configure the event delay threshold; e.g., the media guidance application may provide a user interface for setting the event delay threshold. The media guidance application may, therefore, in response to determining the event delay amount exceeds the event delay threshold, continue to generate for display the media asset notwithstanding receipt of the suspend command. But in response to determining the event delay amount does not exceed the event delay threshold, the media guidance application may suspend playback of the media asset.

In some embodiments, it is advantageous for the media guidance application to determine the impact of travel on the user when determining whether to continue playback. In such embodiments, the media guidance application may determine an event location of the next event and the current location of the user. Using this information, the media guidance application may determine the user's estimated time of arrival to the location of the event and compare the estimated time of arrival to the most current event start time to compute an early arrival amount. The media guidance application may determine whether the early arrival amount exceeds an early arrival threshold. For example, it may be that, despite a dinner meeting moving from 6:30 PM to 7:30 PM, the user does not have an additional hour based on the necessary travel time. For example, the media guidance application may estimate that the user will arrive to the dinner meeting at 7:25 PM based on necessary travel time, and the media guidance application may consider the five-minute arrival window too small to continue playback. In such an example, the early arrival threshold may be fifteen minutes and the early arrival amount must meet, or exceed, fifteen minutes for the media guidance application to continue playback. In some embodiments, the media guidance application may be hard coded with an early arrival threshold. In other embodiments, the media guidance application may store a modifiable early arrival threshold to indicate how early a user must be estimated to arrive before the next event before the media guidance application continues playback despite receiving the suspend command. The media guidance application may also retrieve an early arrival threshold from an external source; e.g., a user profile stored on a remote server may contain the early arrival threshold. Further, the media guidance application may allow the user to configure the early arrival threshold; e.g., the media guidance application may provide a user interface for setting the event early arrival threshold.

In some embodiments, the media guidance application may determine a predictive departure time when determining whether to continue playback. For example, by using the most current event start time, the media guidance application may determine, based on travel requirements (traffic conditions, transit schedules, etc.), that the user must leave the current location at a specific time to arrive at the event on time. For example, it may be that at 4:30 PM, the media guidance application receives a suspend playback command from the user and that the media guidance application determines that the user has a 6:30 PM dinner meeting on the user's personal calendar. The media guidance application may determine that the user stored information in a personal calendar indicating a travel plan including plans to take a bus to the location of the dinner meeting. The media guidance application may also determine that no buses run after 5:00 PM, and, for the user to arrive on time for the 7:30 PM dinner, the user must take the 5:00 PM bus. In this example, the media guidance application may determine a predictive departure time of 4:45 PM to provide the user sufficient time to ride the 5:00 PM bus. Thus, while the user's dinner may be delayed from 6:30 PM to 7:30 PM, the user did not gain an additional hour that could be used to continue playing the episode the user is watching. The media guidance application may use the current time and the predictive departure time to make the determination of whether to continue playback. For example, if the media guidance application determines a predictive departure time later than the current time, then the media guidance application may continue to generate for display the media asset notwithstanding receipt of the suspend command. In some embodiments, the media guidance application may determine whether a departure delay amount, e.g., the difference between the predictive departure time and the current time, exceeds a departure delay threshold. In some embodiments, the media guidance application may be hard coded with a departure delay threshold. In other embodiments, the media guidance application may store a modifiable departure delay threshold to indicate how much time a user must have before departure of the current location for the media guidance application to continue playback. The media guidance application may also retrieve a departure delay threshold from an external source, e.g., a user profile stored on a remote server may contain the departure delay threshold. Further, the media guidance application may allow the user to configure the departure delay threshold, e.g., the media guidance application provide a user interface for setting the departure delay threshold. The media guidance application may, in response to determining that the departure delay amount exceeds the departure delay threshold, continue to generate for display the media asset notwithstanding receipt of the suspend command. In another example, the media guidance application may determine a departure delay of five minutes, and the media guidance application may determine that the five-minute departure window is too small to continue playback. In such an example, the media guidance application may determine that the departure delay threshold is fifteen minutes and the departure delay amount must meet, or exceed, fifteen minutes for the media guidance application to continue playback.

In some embodiments, it may be beneficial for the media guidance application to delay suspension of the playback in response to a suspend command. In such embodiments, the media guidance application delays suspension of playback of the media asset. The media guidance application may determine a current playback point of the media asset. For example, the user may have watched 33 minutes and 9 seconds, i.e., 33:09, of an episode of a show, and the current playback point of the media asset is 33:09. As described above, the media guidance application may determine an imminence threshold that indicates how close in time an event must start to be considered imminent. And the media guidance application may use the imminence threshold to determine that the event start time of the next event, e.g., the start time of the event as stored in the user's profile, is imminent in relation to the current time. For example, the media guidance application may determine that the imminence threshold is five minutes and that an event with a start time five minutes or less from the current time is considered imminent. The media guidance application may also compute a most current event start imminence time based on the most current event start time and the imminence threshold. For example, the media guidance application may determine that a meeting was delayed from 6:30 PM to 7:30 PM and that the imminence threshold is five minutes. In this example, the media guidance application may determine that the most current event start imminence time is 7:25 PM, i.e., five minutes before the most current event start time. Thus, the media guidance application can plan for when the next event will become imminent with respect to the most current event start time, i.e., the delayed start time. The media guidance application may identify a suspension time based on the current playback point, the current time, the most current event imminence time, and a plurality of scene end points. For example, the media guidance application may identify a suspension time by determining that a scene in the media asset will end before the most current event start imminence time such that playback can be suspended at a natural pause in the media asset before the next event becomes imminent according the most current event start time. In some embodiments, the media guidance application may determine whether the current point of playback is within a scene that will not end before the most current event start imminence time, and, when the current scene will not end before the most current event start imminence time, will identify the suspension time as the most current event start imminence time. The media guidance application may schedule suspension of playback to occur at the suspension time.

In some embodiments, the media guidance application attempts to identify the suspension time from among a plurality of scene end points. The media guidance application may analyze the media asset to determine the plurality of scene end points. In some scenarios, the media guidance application may identify metadata corresponding to the media asset that identifies scenes including scene start points, scene end points, and/or scene durations. In another scenario, the media guidance application may analyze the content of the media asset to identify content that corresponds with a scene end point (e.g., an audio-visual presentation may contain a three-second black screen with no perceptible sound which corresponds with the end of a scene). The media guidance application may then compute a plurality of scene end times based on the current time, current playback point, and the plurality of scene end points. For example, the media guidance application may determine that the media asset contains three scenes ending at playback points of 15:00, 30:00, and 45:00 of the media asset and the current playback point is 33:09. The media guidance application may then determine that the last scene has a scene end time of 11 minutes and 51 seconds from the current time. The media guidance application may determine whether there is at least one scene end time among the plurality of scene end times that occurs before the most current event imminence time. For example, the media guidance application may determine that the current time is 4:30 PM and the most current event imminence time is 7:25 PM. In this example, the media guidance application may determine that a scene ending 11 minutes and 51 seconds from the current time will end at approximately 4:42 PM, which occurs well before 7:25 PM. In this example, the media guidance application would determine that the third scene end point could be identified as the suspension time, e.g., 4:42 PM. In another example, the media guidance application may determine that the current time could be 7:15 PM and the most current event imminence time is 7:25 PM. In this example, the media guidance application could determine that a scene ending in 11 minutes and 51 seconds would end after 7:25 PM and the scene end time would be too late to use as a suspension time. Thus, the media guidance application may determine that the suspension time should be the most current event imminence time, e.g., 7:25 PM. Thus, the media guidance application may, in response to determining that at least one scene end time, among the plurality of scene end times, occurs before the most current event imminence time identify, as the suspension time, the scene end time, among the plurality of scene end times, closest to the most current event imminence time without occurring after the most current event imminence time. But the media guidance application may, in response to determining there are no scene end times among the plurality of scene end times that occur before the most current event imminence time, identify, as the suspension time, the most current event imminence time.

In another embodiment, the media guidance application may delay suspension of playback of the media asset by determining a suspension time based on the amount of time before the event start time and the most current event start time. For example, the media guidance application may receive a suspend command from the user at 4:25 PM and determine that the user has a meeting originally scheduled for 6:30 PM that was delayed to 7:30 PM. In this example, the media guidance application may infer that it should suspend playback of the media asset 2 hours and 5 minutes before the event. Thus, the media guidance application could determine the suspension time is 5:25 PM based on the most current event start time (7:30 PM) and the amount of time before the event start time (2 hours and 5 minutes). Accordingly, the media guidance application may provide a snooze-like function by determining an amount of delay between the event start time and the most current event start time and delay suspension of playback for that amount of delay. In some embodiments, the media guidance application may provide a next scene suspension where the media guidance application automatically suspends playback at the end of the current scene of the media asset. For example, in response to determining that the next event is delayed, the media guidance application could identify the next scene end time. Using the next scene end time, the media guidance application could schedule an automatic suspension of playback to occur at the next scene end time. In a similar embodiment, the media guidance application may provide the user with a prompt to allow the user to select whether to snooze the suspension of playback to the end of the current scene.

While the techniques above have been described with reference to when a next event has been delayed, one of skill in the art would recognize that the techniques disclosed herein may also be applied to when a next event has been cancelled. For example, in response to a suspend command the media guidance application may determine that a next event is imminent. In the process of determining whether the next event is delayed, the media guidance application may determine that the next event was cancelled. For example, the media guidance application may attempt to access an entry in the user's professional calendar stored on a server associated with the user's employer and determine that the entry, or lack of the entry, indicates that the event was cancelled. The media guidance application may respond to this determination by informing the user that the event was cancelled and continuing to play back a media asset notwithstanding receiving a suspend command.

One of skill in the art would recognize that the techniques disclosed herein may also be applied to other scenarios. For example, while the techniques with respect to when a user is watching a show with a media guidance application, similar techniques may be employed by a user's mobile device when the user is attending an event with a second event scheduled close in time to the first event. In one embodiment, control circuitry may detect that a user is preparing to leave an event and, employing the techniques described above, determine that a second scheduled event has been delayed. For example, the user may possess a mobile device that contains sensors that can measure acceleration, i.e., an accelerometer. The accelerometer in the user's mobile device may detect forces that suggest the user has stood from a sitting position, and control circuitry may react to that event similarly to a suspend command discussed above by determining whether a next event is imminent. Carrying through with this example, the control circuitry may then employ the techniques discussed above to determine whether the next event is delayed and, if the event is delayed, inform the user in a manner similar to that described above so that the user does not leave the current event earlier than needed. In another embodiment, control circuitry may monitor the user's current location and detect that the user's location changed as compared to a movement threshold to determine the user is leaving a current event. In this way, the techniques discussed above may be employed to ensure a user does not unnecessarily leave an event if a later-occurring event has been delayed or cancelled.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 20 depicts an illustrative flowchart of a process for querying a most current event start time, in accordance with some embodiments of the disclosure.

DETAILED DESCRIPTION

Accordingly, systems and methods are provided herein for controlling playback of a media asset on a user equipment based on indicia that a next event is delayed from an event start time. For example, a media guidance application may detect that a user has requested to pause playback of a media asset being streamed from a media content source, such as an on-demand video streaming service. As an example, it is possible that the user was motivated to request that the playback be paused because a calendar reminder has informed the user that a dinner meeting is approaching. Thus, the media guidance application may, when the pause is requested, determine whether the user's profile has a calendar entry corresponding to a meeting that is imminent. For example, the media guidance application may determine that the command to pause playback occurs close in time to a meeting from the user's calendar and infer that the user intends to pause playback in anticipation of that meeting. In another embodiment, the media guidance application may respond to an audible alert by correlating the audible alert with an upcoming event. Using this correlation, the media guidance application may infer that a pause command received close in time to the audible alert is in anticipation of the upcoming meeting. In response to determining the suspend command, e.g., pause command, was received close in time to a scheduled event, the media guidance application may determine that the originally scheduled start time of the meeting is delayed. Thus, the media guidance application may determine that the user has additional time to continue watching the play back before the delayed start time of the meeting, and the media guidance application may therefore continue playback of the media asset despite receiving a command from the user to suspend playback of the media asset.

Figure 1:
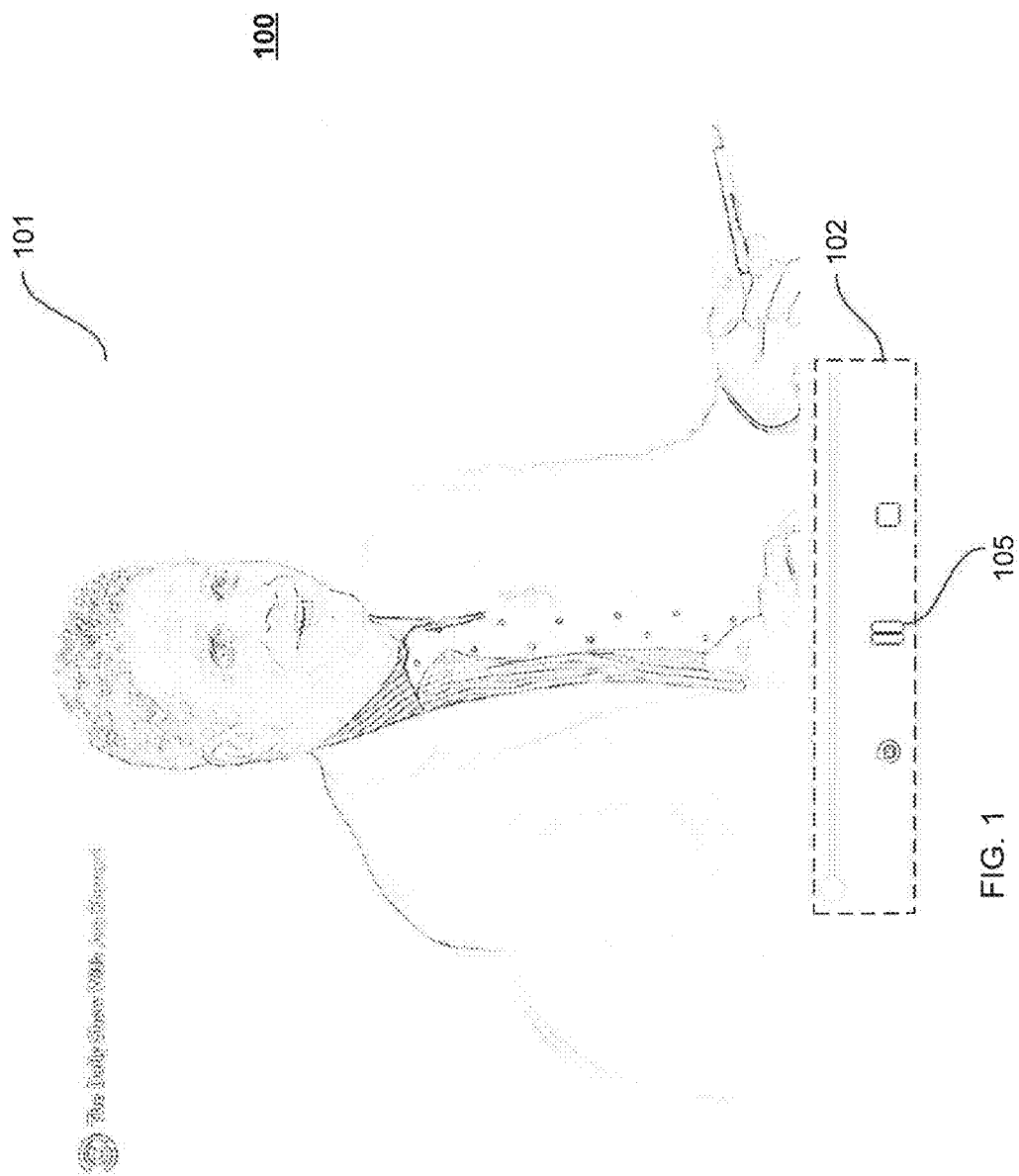
FIG. 1 depicts an illustrative embodiment of a display screen that may be used to provide playback control of a media asset in accordance with some embodiments of the disclosure.
Figure 2:
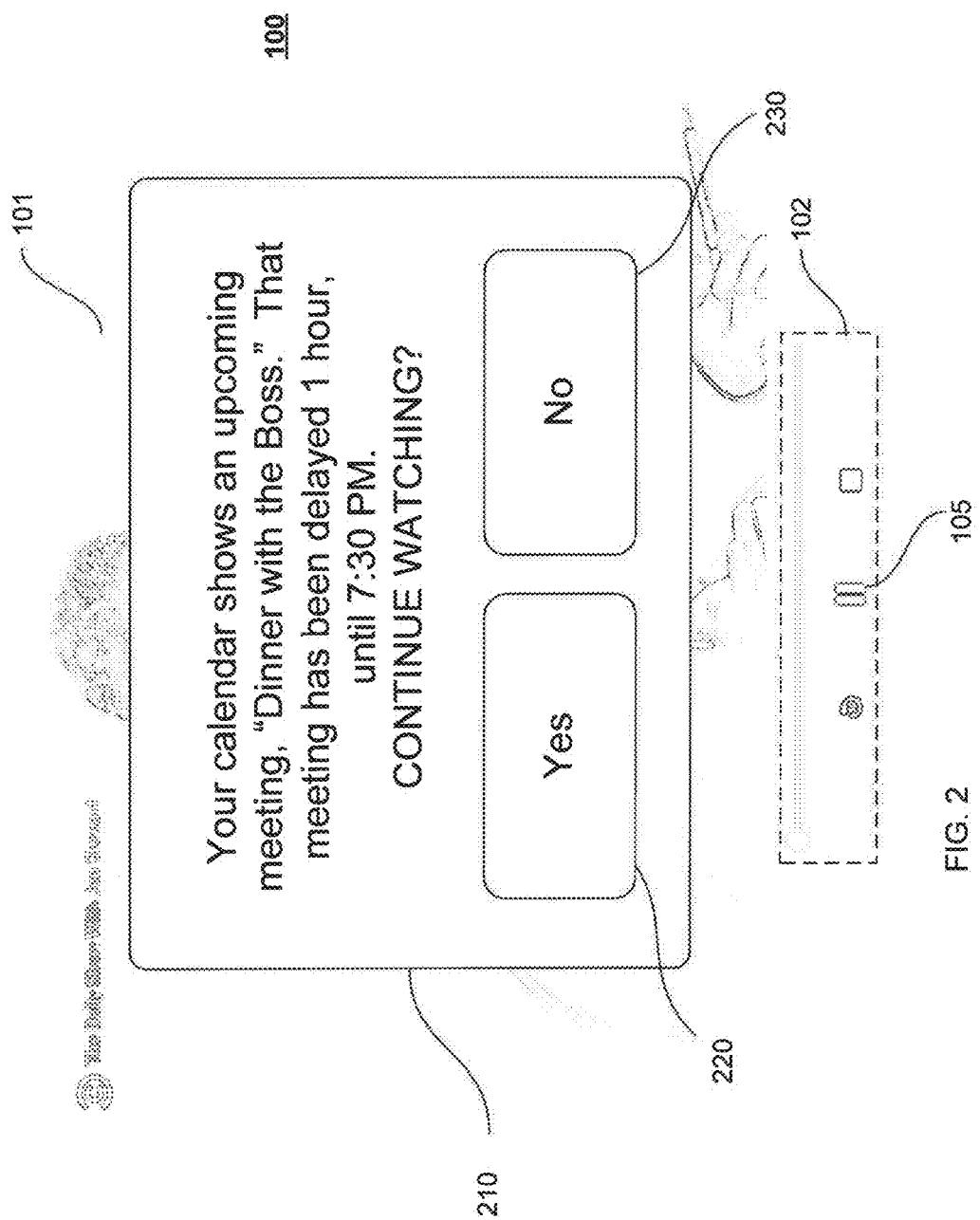
FIG. 2 depicts another illustrative embodiment of a display screen that may be used to provide playback control of a media asset in accordance with some embodiments of the disclosure.

FIGS. 1 and 2 depict an illustrative embodiment of a display screen that may be used to provide playback control of a media asset 101 in accordance with some embodiments of the disclosure. FIGS. 1 and 2 depict media guidance application 100 which may be implemented on user equipment by control circuitry. The functionality of user equipment, control circuitry, and the media guidance application is described in further detail with respect to FIGS. 4-7.

In FIG. 1, the media guidance application 100 is generating playback of media asset 101 and generating playback controls 102 including a pause control 105. For example, media guidance application 100 may be playing back media asset 101, e.g., "The Daily Show" with Jon Stewart. At this time, the media guidance application 100 receives a suspend command from the user. For example, the user may invoke a pause control 105 to issue a pause command. The media guidance application 100 may detect that the user has requested to pause playback of a media asset being streamed from a media content source, such as a video streaming service. As an example, it is possible that the user was motivated to request that the playback be paused because a calendar reminder has informed the user that a dinner meeting is approaching. Thus, the media guidance application 100 may, when the pause is requested, determine whether the user's profile has a calendar entry corresponding to a meeting that is imminent. The media guidance application 100, however, may determine that the originally scheduled start time of the meeting is delayed. For example, the media guidance application 100 may determine that a meeting on the user's calendar has moved from 6:30 PM to 7:30 PM. Thus, the media guidance application 100 may determine that the user has additional time to continue watching play back before the delayed start time of the meeting, and the media guidance application 100 may therefore automatically continue playback of the media asset despite receiving a command from the user to suspend playback of the media asset. In some embodiments, the media guidance application 100 may generate an optional delay prompt 210 including a first user selection 220 and a second user selection 230. The optional delay prompt 210 may present information informing a user that an event from the user's calendar has moved, e.g., from 6:30 PM to 7:30 PM. The media guidance application 100 may ask the user whether to continue playback of the media asset and present user interface elements for receiving the user's selection. For example, a "Yes" box 220 may be selectable to indicate that the media guidance application 100 should continue playback of media asset 101 and a "No" box 230 may be selectable to indicate that the media guidance application 100 should suspend playback of media asset 101.

While FIGS. 1 and 2 depict a pause control 105, one of skill in the art would appreciate that other commands in media guidance application 100 may be treated as similar suspend commands. For example, a stop command has a similar effect to a pause command, and for the processes described herein, the media guidance application 100 may treat a stop command as a suspend command. Also, a command to exit media guidance application 100 may have the effect of suspending playback of a media asset 101 and for the processes described herein, the media guidance application 100 may treat an exit command as a suspend command. Those skilled in the art would recognize that while the media guidance application 100 depicts a suspend control, i.e., pause control 105, generated along with the display of the media asset 101, other embodiments of the media guidance application 100 may receive the suspend command from a remote control or by voice input.

In some embodiments, the media guidance application 100 may respond to an audible alert by correlating the audible alert with an upcoming event. For example, the media guidance application 100 may detect an audible alert issued by a user's mobile device associated with a calendar notification. The media guidance application 100 may compare the audible alert with a database of sounds associated with calendar events and, if the audible alert matches a sound from the database, correlate the audible alert with a calendar event. Using this correlation, the media guidance application 100 may infer that a suspend command received close in time to the audible alert is in anticipation of the upcoming meeting. For example, if the media guidance application 100 detects an audible alert and suspend command, e.g., an input received from a pause control 105, within the imminence threshold associate with a calendar event, the media guidance application 100 may infer that the suspend command was issued in anticipation of the calendar event. In response to receiving the suspend command, e.g., a pause command received from pause control 105, close in time to a schedule event, the media guidance application 100 may determine that the originally scheduled start time of the meeting is delayed. Thus, the media guidance application 100 may determine that the user has additional time to continue watching play back before the delayed start time of the meeting, and the media guidance application 100 may therefore continue playback of the media asset 101 despite receiving a command from the user to suspend playback of the media asset 101.

Figure 3:
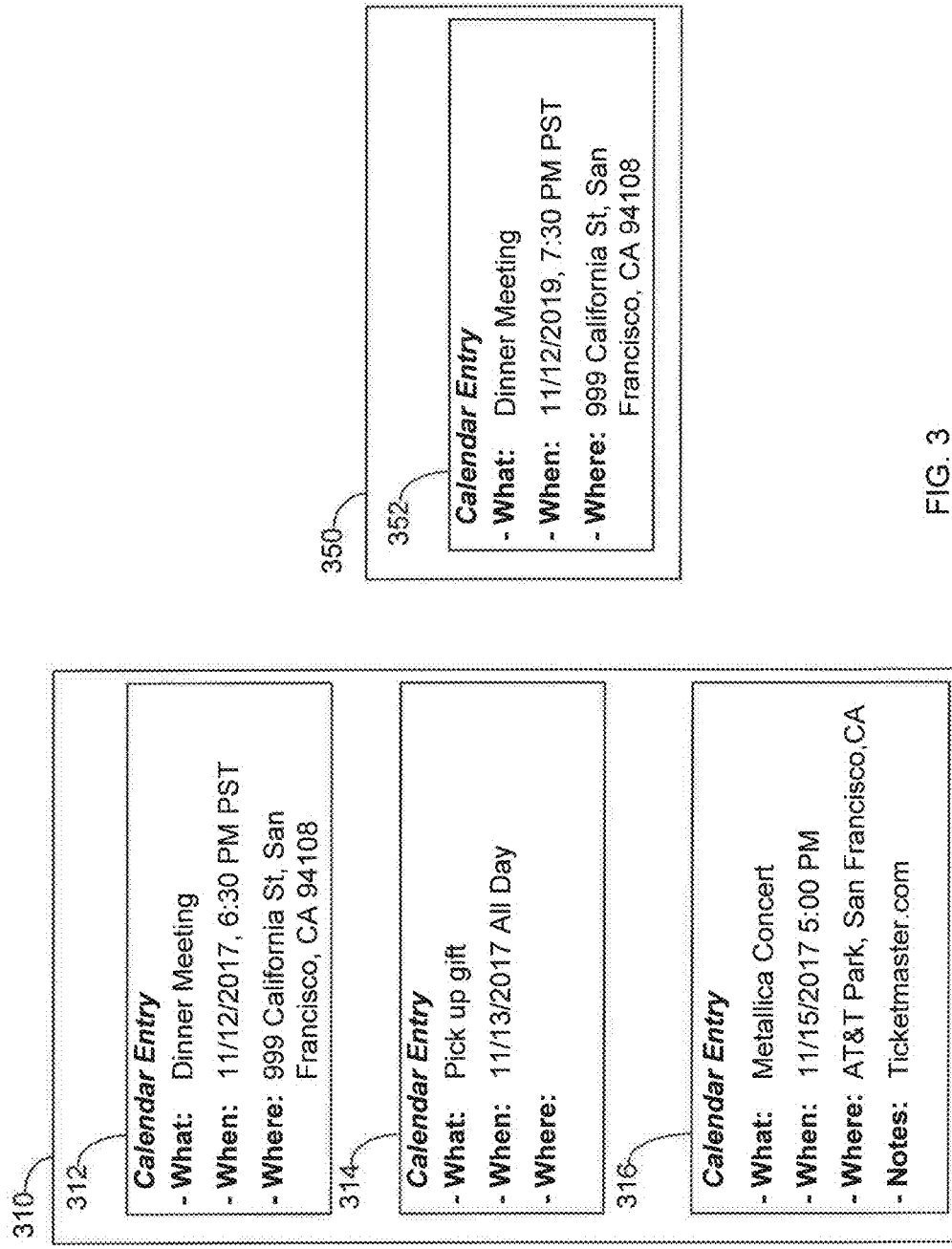
FIG. 3 shows illustrative embodiments of calendar entries used by the media guidance application in accordance with some embodiments of the disclosure.

In some embodiments, a media guidance application 100 (e.g., executed by control circuitry of user equipment or of a server remote from user equipment) may identify a plurality of events a user has planned to attend. Functionality of control circuitry, user equipment, servers, and communications networks are described in further detail below with respect to FIGS. 4-7. The media guidance application 100 may identify the entries by accessing a user profile 310 as depicted in FIG. 3, which may be located in memory of the user equipment or of a remote database (as described further below with respect to FIGS. 4-7). For example, the media guidance application 100 may obtain a user profile 310 that contains calendar information including three calendar events 312, 314, and 316. The media guidance application 100 may determine that the calendar events contain information, data, and metadata associated with the events. For example, the media guidance application 100 may determine that a first calendar entry 312 describes a dinner meeting that a user is scheduled to attend. The media guidance application 100 may determine that the user's profile 310 indicates that the dinner meeting 312 begins on Nov. 12, 2017 at 6:30

PM PST and is at a restaurant located at 999 California St., San Francisco Calif. 94018. The media guidance application 100 may further determine that the calendar information in the user's profile 310 may include a second calendar entry 314 that is a reminder for the user to pick up a gift on Nov. 13, 2017 (without an associated time or location). The media guidance application 100 may determine that a third calendar entry 316 in the calendar information from the user's profile 310 designates a concert the user has on a calendar on Nov. 15, 2017 at 5:00 PM which takes place at AT&T Park in San Francisco, Calif., and that the third calendar entry 316 contains notes that associate the concert with a ticket provider, e.g., Ticketmaster ("Ticketmaster" is a registered trademark of Live Nation Entertainment, Inc.). The media guidance application 100 may determine that another source has information corresponding with the first calendar entry 312 that is more current than the information in calendar entry 312 from the user's profile 310. For example, the media guidance application 100 may determine that a remote database 350 contains a calendar entry 352 that is associated with the same meeting as calendar entry 312. The media guidance application 100 may further determine that the event start time in calendar entry 352 is different from calendar entry 312 and using calendar entry 352 determine that the event associated with calendar entries 312 and 352 has been delayed from the event start time located in calendar entry 312. Using this information, the media guidance application 100 may control playback of media assets, particularly in response to receiving commands to suspend playback that occur close in time to event start times.

In some embodiments, the media guidance application 100 may determine whether the next event is associated with an outdoor event, e.g., a sporting event or concert. For example, the user's calendar entry may be associated with an outdoor venue or may be associated with tickets that indicate, either implicitly or explicitly, that the event is outdoors. In the case where the media guidance application 100 determines that the next event is associated with an outdoor event, the media guidance application 100 may analyze weather reports associated with the location of the next event to determine whether there exists a likelihood that the outdoor event will be delayed. For example, the media guidance application 100 may determine there is a 51% likelihood that the location of the outdoor event will experience rain near the scheduled start of the next event. The media guidance application 100 may then compare the 51% likelihood against a predicted weather delay threshold to determine whether it is likely the outdoor event will be delayed in response to the weather. In another embodiment, the media guidance application 100 determines additional characteristics of the reported weather for the event location such as expected rain volume, wind speed, temperature, and/or humidity and combines the expected weather characteristics to make the determination of whether the outdoor event is likely to be delayed. One of skill in the art would recognize that in some situations local weather may impact indoor events as well as outdoor events, e.g., severe weather could impact indoor events, and the media guidance application 100 may apply techniques described above to indoor events in a similar manner.

The systems and methods described herein may be implemented by a media guidance application made available on a user equipment device 100. The media guidance application 100 may receive a suspend command, e.g., a pause command issued by a user pressing a pause control 105, during playback of a media asset 101 that has remaining runtime, and the suspend command may indicate that the playback of the media asset 101 should be suspended. In some aspects of the disclosure, the media guidance application 100 may intercept the suspend command or otherwise receive the suspend command. The media guidance application 100 may respond to the suspend command by determining whether a user watching the playback of the media asset 101 is imminently scheduled to attend an event, e.g., a meeting.

In some embodiments, to determine whether the user is imminently scheduled to attend an event, the media guidance application 100 may retrieve a profile 310 corresponding to the user from a database. For example, the media guidance application 100 may access the user's calendar stored in an electronic format (e.g., in Microsoft Outlook, which is a popular software application used to manage email and calendar information). In other embodiments, the media guidance application 100 may obtain portions of the profile 310 from across a collection of several databases. For example, the media guidance application may 100 obtain the user's personal calendar from one database (e.g., in a calendar associated with a mobile device), may obtain a joint calendar the user shares with friends or family from a cloud-based calendar database (e.g., in association with a free web-based service like Google Calendar), and may obtain the user's professional calendar from a server associated with the user's employer. The media guidance application 100 may combine entries from each calendar to form the profile 310 corresponding to the user. Using the profile 310 corresponding to the user, the media guidance application 100 may determine the next event, e.g., a dinner meeting corresponding with calendar entry 312, the user is scheduled to attend from among many events associated with the user. The media guidance application 100 may use this information to determine the event start time, e.g., 6:30 PM, of the next event. For example, media guidance application 100 may access a list of event names and associated start times from the user's profile, and the media guidance application 100 may select the most recent but not yet passed event as the next event and extract the start time associated with the next event from the profile 310.

In some embodiments, the media guidance application 100 may determine the next event from the user's calendar information and the calendar information may contain both meetings (e.g., dinner meeting 312) and reminders unrelated to meetings (e.g., a calendar entry reminding the user to buy a birthday gift 314). It may be advantageous to discern meetings from events. Thus, the media guidance application 100 may obtain a plurality of entries from the calendar information in the user's profile and analyze the plurality of entries to identify a plurality of meetings. The media guidance application 100 may analyze the plurality of meetings to obtain a plurality of meeting start times associated with the plurality of meetings. The media guidance application 100 may then identify the next event from the plurality of meetings based on the plurality of meeting start times. For example, the media guidance application 100 may determine that a user's profile contains three events in the calendar information: a reminder to purchase a birthday gift 314, a dinner meeting for 7:30 PM on the current day 312, and a movie date for the next day 5:00 PM 316. The media guidance application 100 may use metadata about the events (e.g., locations, start times, end times, durations, notes) to determine which among the events is a meeting and which meeting occurs next in time. In this example, the dinner meeting at 7:30 PM is the next meeting and the media guidance application 100 would, therefore, identify this event as the next event.

In some embodiments, the media guidance application 100, when determining whether the user is imminently scheduled to attend an event, may compare the event start time of the next event to the current time and compute the amount of time left before the next event starts. The media guidance application 100 may then compare the amount of time left with an imminence threshold. For example, the media guidance application 100 may consider an event imminent if the event has an event start time within five minutes of the current time. In some embodiments, the media guidance application 100 may be hard coded with an imminence threshold. In other embodiments, the media guidance application 100 may store a modifiable imminence threshold to indicate how close in time an event must be to be considered imminent. The media guidance application 100 may also retrieve an imminence threshold from an external source; e.g., a user profile stored on a remote server may contain the imminence threshold. Further, the media guidance application 100 may allow the user to configure the imminence threshold; e.g., the media guidance application 100 may provide a user interface for setting the imminence threshold.

In some embodiments, the media guidance application 100 may consider an event imminent when the start of the event occurs within a time period less than the imminence threshold. The media guidance application 100 may respond to determining that the user is imminently scheduled to attend an event by determining whether the start time of the next event was delayed. For example, the media guidance application 100 may retrieve details of a meeting 312 in the user's personal calendar stored on a mobile device. The media guidance application 100 may find that the same meeting is associated with an entry 350 in the user's professional calendar stored on a server associated with the user's employer. The media guidance application 100 may determine that the event has been updated in the user's professional calendar with a start time later than the start time in the user's personal calendar. Therefore, the media guidance application 100 may consider the event may be delayed.

In some embodiments, the media guidance application 100 may determine the most current start time of the event was delayed by first determining an identity of an event database associated with the next event. For example, the media guidance application 100 may identify that a meeting is associated with a database on an employer's server. Using the identity of the event database, the media guidance application 100 may query the event database to determine whether the start time of the event was updated and determine the most current event start time. The media guidance application 100 may then compare the most current event start time of the next event to the start time of the next event that was obtained from the user's profile. E.g., the media guidance application 100 may compare the start time of the event as stored in the user's personal calendar to the start time of the same event as stored on the employer's server. The media guidance application 100 may then determine that the event has been delayed when the most current event start time is later than the event start time from the user's profile.

In some embodiments, the media guidance application 100 may determine the identity of the event database associated with the next event using information about the next event. The media guidance application 100 may obtain event metadata associated with the next event. For example, the media guidance application 100 may use calendar information 312 stored in the user's profile 310 to obtain information about the next event (e.g., location, start time, end time, duration, attendees, notes, associated websites, associated service providers, event origin, associate accounts). The media guidance application 100 may determine an event database indicator based on the event metadata and identify the event database associated with the next event based on the event database indicator. For example, the media guidance application 100 may determine that the next event is a dinner meeting associated with the user's work email address, and the media guidance application 100 may determine that the event database is the employer's Microsoft Exchange server, a popular corporate email and calendaring server. In another example, the media guidance application 100 may determine the next event is a concert associated with a ticket provider, such as Ticketmaster, and determine that the event database is a web service associated with the ticket provider.

In some embodiments, the media guidance application 100 responds to determining that the most current event start time is delayed by continuing to generate for display the media asset 101 notwithstanding receipt of the suspend command. For example, the media guidance application 100 receives a suspend command, e.g., a pause command in response to input on a pause control 105, from the user during playback of an episode of a show, e.g., "The Daily Show" as depicted in FIGS. 1 and 2, and the media guidance application 100 may infer that the user issued the suspend command because of a scheduled meeting, e.g., because the user's personal calendar indicates that a meeting is starting soon. The media guidance application 100 could then determine that the meeting was moved (e.g., from 6:30 PM to 7:30 PM) such that the user has additional time to continue watching the episode. Using this determination, the media guidance application 100 can determine to continue playing the episode despite having received a pause command from the user.

In some embodiments, it is advantageous for the media guidance application 100 to prompt the user regarding the change in event start time and provide an option of whether to suspend or continue playback. In this regard, the media guidance application 100 may respond to determining that the most current event start time is delayed by simultaneously displaying to the user (1) information indicating that the most current event start time is later than the event start time and (2) a selectable option for continuing to generate for display the media asset 101 notwithstanding receipt of the suspend command. For example, the media guidance application 100 may display a prompt 210 indicating that a meeting moved from 6:30 PM to 7:30 PM and ask the use whether the user would like to continue watching an episode of the show. The media guidance application 100 would receive a selection from the user of selectable options 220 and 230 (e.g., "yes, continue watching" or "no, stop watching"). In response to receiving the selection from the user of the selectable option 220, the media guidance application 100 may then continue to generate for display the media asset 101 notwithstanding receipt of the suspend command per the user's selection.

In some embodiments, it is advantageous for the media guidance application 100 to determine for how long the event was delayed while determining whether to continue playback. In this regard, the media guidance application 100 may respond to determining that the most current event start time is delayed by computing how long the event was delayed, i.e., an event delay amount. The media guidance application 100 may, for example, compare the most current event start time to the event start time to compute the event delay amount. The media guidance application 100 may determine whether the event delay amount exceeds an event delay threshold. For example, if a dinner meeting on the user's calendar was delayed five minutes from the event start time stored in the user's personal calendar, the media guidance application 100 may consider this delay too little to continue playback. In such an example, the event delay threshold may be thirty minutes and the event delay must meet, or exceed, thirty minutes for the media guidance application 100 to continue playback. In some embodiments, the media guidance application 100 may be hard coded with an event delay threshold. In other embodiments, the media guidance application 100 may store a modifiable event delay threshold to indicate how long in time an event must be delayed for the media guidance application 100 to continue playback despite receiving the suspend command. The media guidance application 100 may also retrieve an event delay threshold from an external source; e.g., a user profile stored on a remote server may contain the event delay threshold. Further, the media guidance application 100 may allow the user to configure the event delay threshold; e.g., the media guidance application 100 may provide a user interface for setting the event delay threshold. The media guidance application 100 may, therefore, in response to determining the event delay amount exceeds the event delay threshold, continue to generate for display the media asset 101 notwithstanding receipt of the suspend command. But in response to determining the event delay amount does not exceed the event delay threshold, the media guidance application 100 may suspend playback of the media asset 101.

In some embodiments, it is advantageous for the media guidance application 100 to determine the impact of travel on the user when determining whether to continue playback. In such embodiments, the media guidance application 100 may determine an event location of the next event and the current location of the user. Using this information, the media guidance application 100 may determine the user's estimated time of arrival to the location of the event and compare the estimated time of arrival to the most current event start time to compute an early arrival amount. The media guidance application 100 may determine whether the early arrival amount exceeds an early arrival threshold. For example, it may be that, despite a dinner meeting moving from 6:30 PM to 7:30 PM, the user does not have an additional hour based on the necessary travel time. For example, the user may be estimated to arrive to the dinner meeting at 7:25 PM based on necessary travel time, and the user may consider the five-minute arrival window too small to continue playback. In such an example, the early arrival threshold may be fifteen minutes and the early arrival amount must meet, or exceed, fifteen minutes for the media guidance application 100 to continue playback. In some embodiments, the media guidance application 100 may be hard coded with an early arrival threshold. In other embodiments, the media guidance application 100 may store a modifiable early arrival threshold to indicate how early a user must be estimated to arrive before the next event before the media guidance application 100 continues playback despite receiving the suspend command. The media guidance application 100 may also retrieve an early arrival threshold from an external source; e.g., a user profile stored on a remote server may contain the early arrival threshold. Further, the media guidance application 100 may allow the user to configure the early arrival threshold; e.g., the media guidance application 100 may provide a user interface for setting the event early arrival.

In some embodiments, the media guidance application 100 may determine a predictive departure time when determining whether to continue playback. For example, by using the most current event start time, the media guidance application 100 may determine, based on travel requirements (traffic conditions, transit schedules, etc.), that the user must leave the current location at a specific time to arrive at the event on time. For example, it may be that at 4:30 PM, the media guidance application 100 receives a suspend playback command from the user and that media guidance application 100 determines that the user has a 6:30 PM dinner meeting on the user's personal calendar. The media guidance application 100 may determine that the user stored information in a personal calendar indicating a travel plan including plans to take a bus to the location of the dinner meeting. The media guidance application 100 may also determine that no buses run after 5:00 PM, and, for the user to arrive on time for the 7:30 PM dinner, the user must take the 5:00 PM bus. In this example, the media guidance application 100 may determine a predictive departure time of 4:45 PM to provide the user sufficient time to ride the 5:00 PM bus. Thus, while the user's dinner may be delayed from 6:30 PM to 7:30 PM, the user did not gain an additional hour that could be used to continue playing the episode the user is watching. The media guidance application 100 may use the current time and the predictive departure time to make the determination of whether to continue playback. For example, if the media guidance application 100 determines a predictive departure time later than the current time, then the media guidance application 100 may continue to generate for display the media asset 101 notwithstanding receipt of the suspend command. In some embodiments, the media guidance application 100 may determine whether a departure delay amount, e.g., the difference between the predictive departure time and the current time, exceeds a departure delay threshold. In some embodiments, the media guidance application 100 may be hard coded with a departure delay threshold. In other embodiments, the media guidance application 100 may store a modifiable departure delay threshold to indicate how much time a user must have before departure of the current location for the media guidance application 100 to continue playback. The media guidance application 100 may also retrieve a departure delay threshold from an external source; e.g., a user profile stored on a remote server may contain the departure delay threshold. Further, the media guidance application 100 may allow the user to configure the departure delay threshold; e.g., the media guidance application 100 may provide a user interface for setting the departure delay threshold. The media guidance application 100 may, in response to determining that the departure delay amount exceeds the departure delay threshold, continue to generate for display the media asset 101 notwithstanding receipt of the suspend command. For example, the media guidance application 100 may determine a departure delay of five minutes, and the media guidance application 100 may determine that the five-minute departure window is too small to continue playback. In such an example, media guidance application 100 may determine that the departure delay threshold is fifteen minutes and the departure delay amount must meet, or exceed, fifteen minutes for the media guidance application 100 to continue playback.

In some embodiments, it may be beneficial for the media guidance application 100 to delay suspension of the playback in response to a suspend command. In such embodiments, the media guidance application 100 delays suspension of playback of the media asset 101. The media guidance application 100 may determine a current playback point of the media asset 101. For example, the user may have watched 33 minutes and 9 seconds, i.e., 33:09, of an episode of a show, and the current playback point of the media asset 101 is 33:09. As described above, the media guidance application 100 may determine an imminence threshold that indicates how close in time an event must start to be considered imminent. And the media guidance application 100 may use the imminence threshold to determine that the event start time of the next event, e.g., the start time of the event as stored in the user's profile, is imminent in relation to the current time. For example, the media guidance application 100 may determine that the imminence threshold is five minutes and that an event with a start time five minutes or less from the current time is considered imminent. The media guidance application 100 may also compute a most current event start imminence time based on the most current event start time and the imminence threshold. For example, media guidance application 100 may determine that a meeting was delayed from 6:30 PM to 7:30 PM and that the imminence threshold is five minutes. In this example, the media guidance application 100 may determine that the most current event start imminence time is 7:25 PM, i.e., five minutes before the most current event start time. Thus, the media guidance application 100 can plan for when the next event will become imminent with respect to the most current event start time, i.e., the delayed start time. The media guidance application 100 may identify a suspension time based on the current playback point, the current time, the most current event imminence time, and a plurality of scene end points. For example, the media guidance application 100 may identify a suspension time by determining that a scene in the media asset 101 will end before the most current event start imminence time such that playback can be suspended at a natural pause in the media asset 101 before the next event becomes imminent according the most current event start time. In some embodiments, the media guidance application 100 may determine whether the current point of playback is within a scene that will not end before the most current event start imminence time, and, when the current scene will not end before the most current event start imminence time, will identify the suspension time as the most current event start imminence time. The media guidance application 100 may schedule suspension of playback to occur at the suspension time.

In some embodiments, the media guidance application 100 attempts to identify the suspension time from among a plurality of scene end points. The media guidance application 100 may analyze the media asset 101 to determine the plurality of scene end points. In some scenarios, the media guidance application 100 may identify metadata corresponding to the media asset 101 that identifies scenes including scene start points, scene end points, and/or scene durations. In another scenario, the media guidance application 100 may analyze the content of the media asset 101 to identify content that corresponds with a scene end point (e.g., an audio-visual presentation may contain a three-second black screen with no perceptible sound which corresponds with the end of a scene). The media guidance application 100 may then compute a plurality of scene end times based on the current time, current playback point, and the plurality of scene end points. For example, the media guidance application 100 may determine that the media asset 101 contains three scenes ending at playback points of 15:00, 30:00, and 45:00 of the media asset 101 and the current playback point is 33:09. The media guidance application 100 may then determine that the last scene has a scene end time of 11 minutes and 51 seconds from the current time. The media guidance application 100 may determine whether there is at least one scene end time among the plurality of scene end times that occurs before the most current event imminence time. For example, the media guidance application 100 may determine that the current time is 4:30 PM and the most current event imminence time is 7:25 PM. In this example, the media guidance application 100 may determine that a scene ending 11 minutes and 51 seconds from the current time will end at approximately 4:42 PM which occurs well before 7:25 PM. In this example, the media guidance application 100 would determine that the third scene end point could be identified as the suspension time, e.g., 4:42 PM. In another example, the media guidance application 100 may determine that the current time could be 7:15 PM and the most current event imminence time is 7:25 PM. In this example, the media guidance application 100 could determine that a scene ending in 11 minutes and 51 seconds would end after 7:25 PM and the scene end time would be too late to use as a suspension time. Thus, the media guidance application 100 may determine that the suspension time should be the most current event imminence time, e.g., 7:25 PM. Thus, the media guidance application 100 may, in response to determining that at least one scene end time, among the plurality of scene end times, occurs before the most current event imminence time, identify, as the suspension time, the scene end time, among the plurality of scene end times, closest to the most current event imminence time without occurring after the most current event imminence time. But the media guidance application 100 may, in response to determining there are no scene end times, among the plurality of scene end times, that occurs before the most current event imminence time, identify, as the suspension time, the most current event imminence time.

In another embodiment, the media guidance application 100 may delay suspension of playback of the media asset 101 by determining a suspension time based on the amount of time before the event start time and the most current event start time. For example, the media guidance application 100 may receive a suspend command from the user at 4:25 PM and determine that the user has a meeting originally scheduled for 6:30 PM that was delayed to 7:30 PM. In this example, the media guidance application 100 may infer that it should suspend playback of the media asset 101 2 hours and 5 minutes before the event. In such case, the media guidance application 100 could determine the suspension time is 5:25 PM based on the most current event start time (7:30 PM) and the amount of time before the event start time (2 hours and 5 minutes). In such case, the media guidance application 100 may provide a snooze-like function by determining an amount of delay between the event start time and the most current event start time and delay suspension of playback for that amount of delay.

As noted above, the media guidance application described herein controls playback of a media asset, particularly in response to receiving a suspend command close in time to an event from calendar information in a user's profile. The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
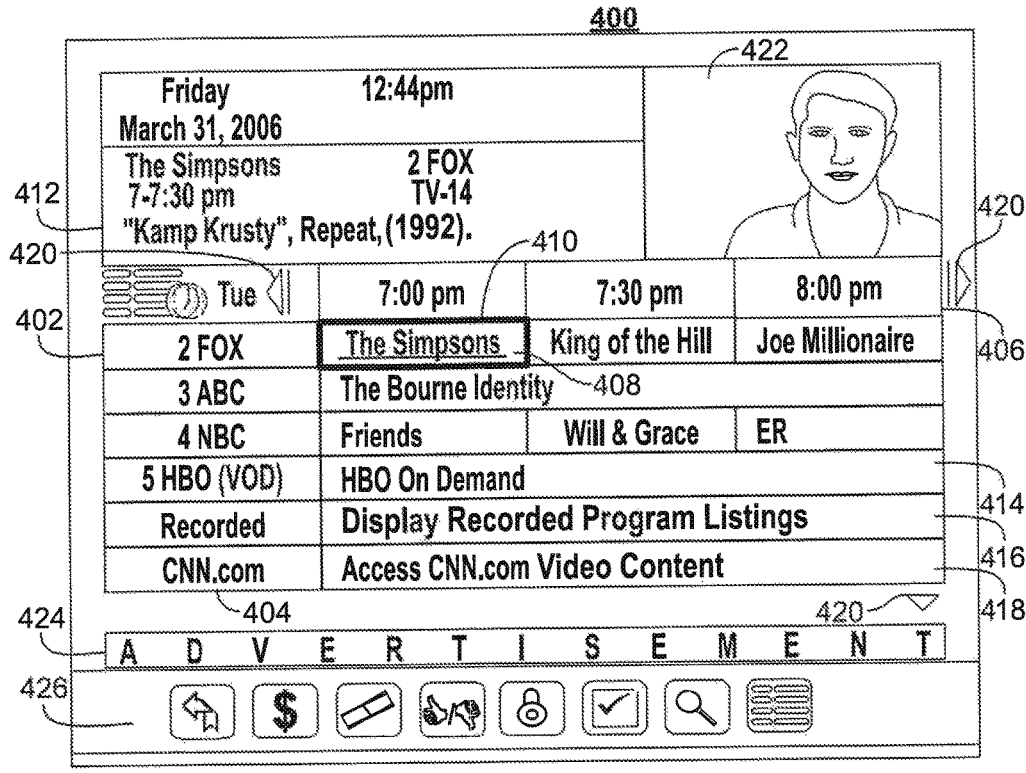
FIG. 4 shows an illustrative embodiment of a display screen that may be used to provide media guidance application listings and other media guidance information, in accordance with some embodiments of the disclosure.
Figure 5:
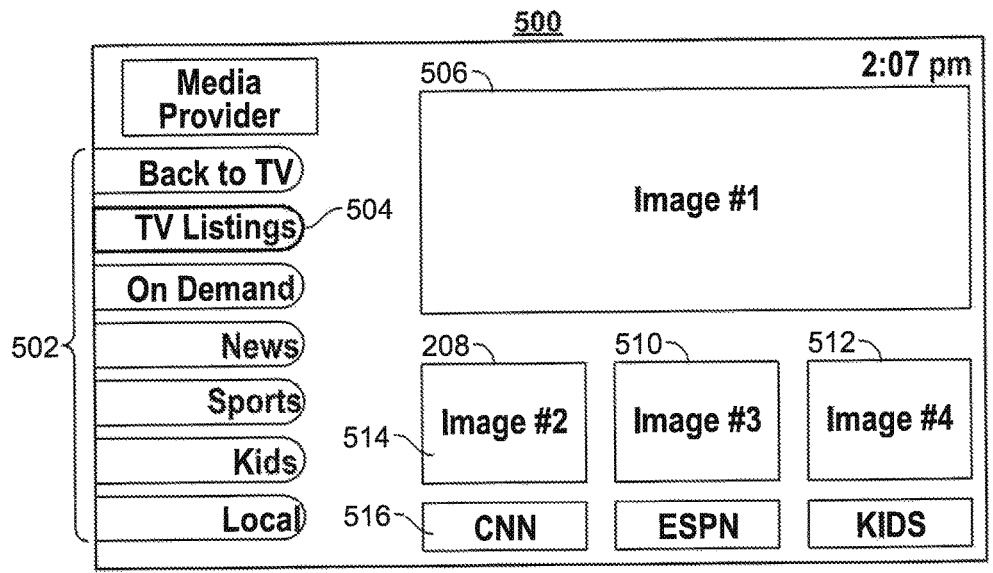
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
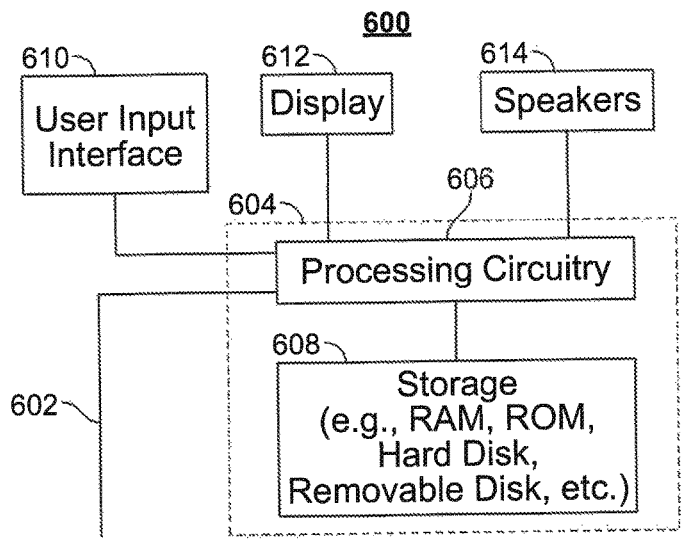
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
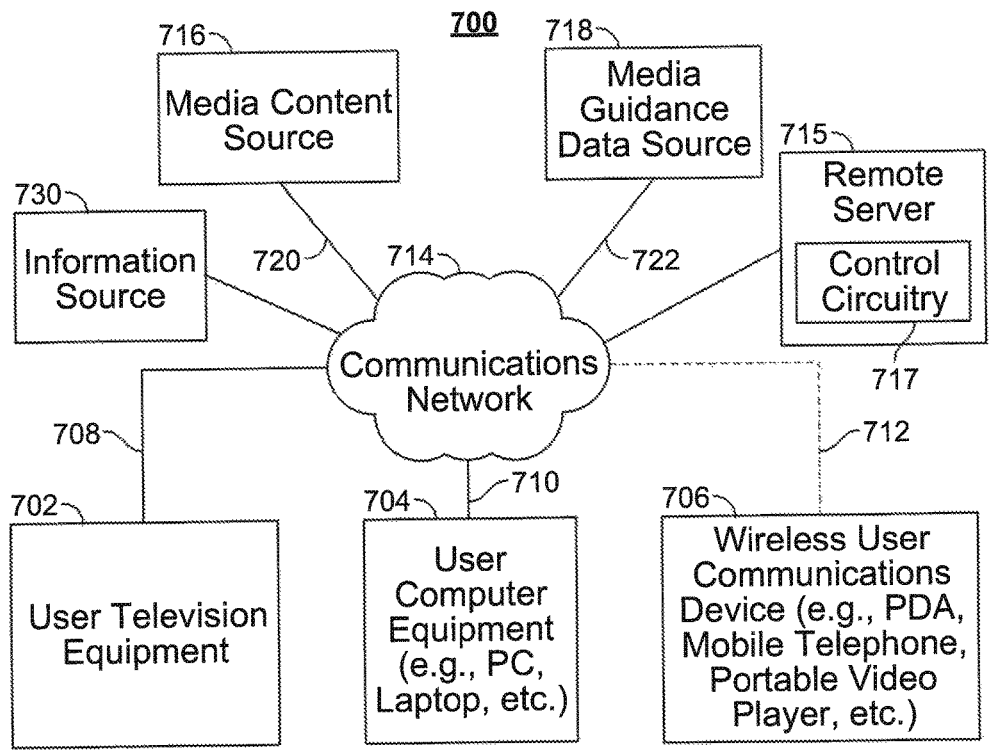
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It should be noted that process 800 or any step thereof could be performed on, or provided by, any of the devices shown in FIGS. 6-7. For example, process 800 may be executed by control circuitry 604 (FIG. 6) as instructed by a media guidance application implemented on a user device (e.g., user equipment devices 702, 704, and/or 706 (FIG. 7)) in order to control playback of a media asset on a user equipment based on indicia that a next event is delayed from an event start time. In addition, one or more steps of process 800 may be incorporated into or combined with one or more steps of any other process or embodiment described herein.

Figure 8:
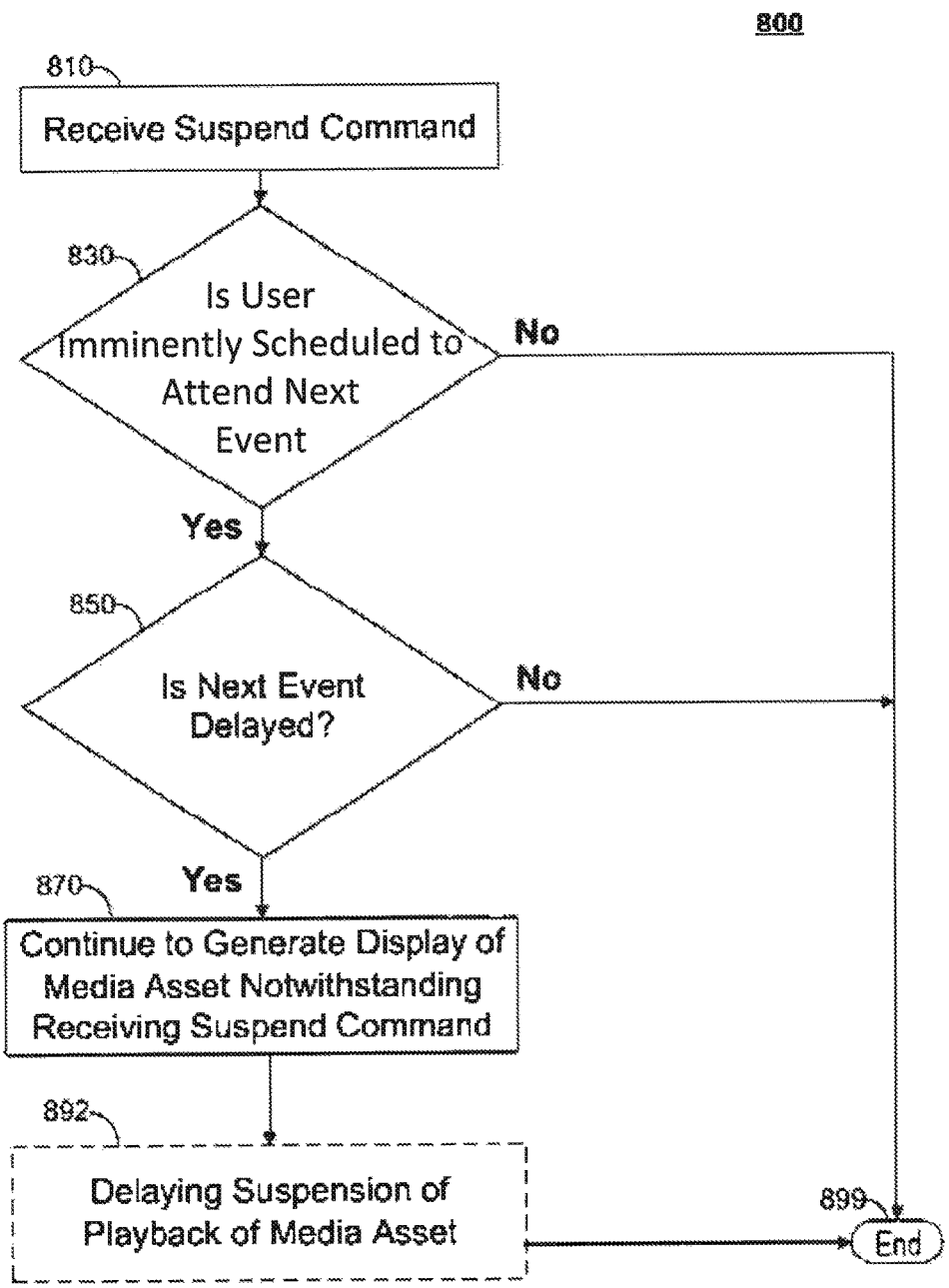
FIG. 8 depicts an illustrative flowchart of a process for controlling playback of a media asset on a user equipment device based on indicia that a next event is delayed from an event start time, in accordance with some embodiments of the disclosure.

FIG. 8 depicts an illustrative flowchart of a process for controlling playback of a media asset on a user equipment based on indicia that a next event is delayed from an event start time, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 800 begins at 810, where control circuitry 604 may, using a media guidance application, receive, during playback of the media asset that has remaining runtime, a suspend command to suspend playback of the media asset. As described above, the suspend command may be in the form of a pause command, stop command, exit command, or other command indicating that playback of a media asset should be suspended.

Process 800 continues to 830 where control circuitry 604 may determine whether a user is imminently scheduled to attend the next event in response to receiving the suspend command. For example, control circuitry 604 may determine that the user is imminently scheduled to attend the next event in accordance with the description of FIG. 9. If the control circuitry 604 determines that the user is not imminently scheduled to attend the next event, the process 800 may conclude at 899. If the control circuitry 604 determines that the user is imminently scheduled to attend the next event, the process 800 continues to 850.

At 850, control circuitry 604 may determine whether an event start time of the next event is delayed. For example, the control circuitry 604 may determine that the next event is delayed in accordance with the description of FIGS. 10 and 11. If the control circuitry 604 determines that the next event is not delayed, the process 800 may conclude at 899. If the control circuitry 604 determines that the next event is delayed, the control circuitry 604 continues to 870.

At 870, control circuitry 604 may automatically continue to generate for display the media asset notwithstanding receipt of the suspend command.

In some embodiments, it may be advantageous for the control circuitry 604 to delay the suspension of playback of the media asset. Therefore, some embodiments of 800 may continue at 892 where control circuitry 604 delays suspension of playback of the media asset. In this way, the control circuitry 604 may provide a snooze-like delay to the suspension of playback when a user's next event has been delayed. In one embodiment, the control circuitry 604 may continue playing the media asset for a pre-determined time period, e.g., 5 minutes.

In other embodiments, control circuitry 604 may perform a series of operations to delay the suspension of playback. For example, control circuitry 604 may delay suspension of playback of the media asset in accordance with the description of FIGS. 15 and 17.

In another embodiment, control circuitry 604 may provide a next scene suspension where the control circuitry 604 automatically suspends playback at the end of the current scene of the media asset. For example, in response to determining that the next event is delayed, the control circuitry 604 could identify the next scene end time in a manner similar to that described with respect to FIG. 15. Using the next scene end time, the control circuitry 604 could schedule an automatic suspension of playback to occur at the next scene end time. In a similar embodiment, the control circuitry 604 may provide the user with a prompt to allow the user to select whether to snooze the suspension of playback to the end of the current scene.

It should be noted that process 830 or any step thereof could be performed on, or provided by, any of the devices shown in FIGS. 6-7. For example, process 830 may be executed by control circuitry 604 (FIG. 6) as instructed by a media guidance application implemented on a user device (e.g., user equipment devices 702, 704, and/or 706 (FIG. 7)) in order to determine whether a user is imminently scheduled to attend a next event. In addition, one or more steps of process 830 may be incorporated into or combined with one or more steps of any other process or embodiment described herein.

Figure 9:
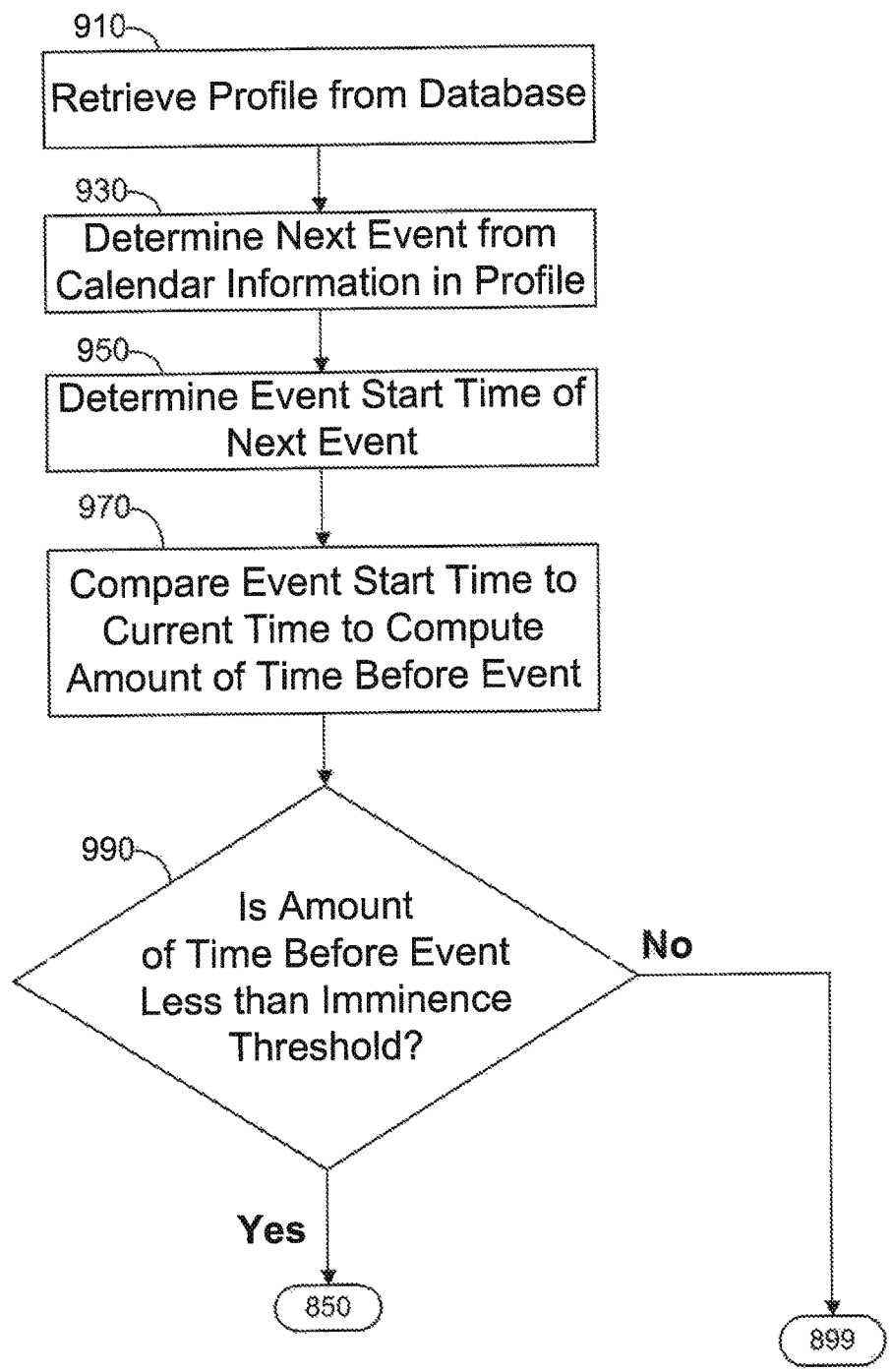
FIG. 9 depicts an illustrative flowchart of a process for determining whether a user is imminently scheduled to attend a next event, in accordance with some embodiments of the disclosure.

FIG. 9 depicts an illustrative flowchart of a process for determining whether a user is imminently scheduled to attend a next event, in accordance with some embodiments of the disclosure. In response to receiving a suspend command, the control circuitry 604 may determine whether a user is imminently scheduled to attend a next event by retrieving a profile corresponding to the user from a database at 910.

The process 830 continues at 930 where the control circuitry 604 may determine the next event, based on calendar information in the profile, from a plurality of entries associated with the user. For example, control circuitry 604 may determine the next event in accordance with the description of FIG. 18.

The control circuitry 604 may continue at 950 by determining the event start time of the next event.

At 970, the control circuitry 604 compares the event start time of the next event to a current time to compute an amount of time before the event start time.

At 990, the control circuitry 604 may determine whether the amount of time before the event the event start time is less than an imminence threshold. In response to determining that the amount of time before the event start time is less than an imminence threshold, the control circuitry 604 may continue at 850 by determining whether the next event has been delayed. In response to determining that the amount of time before the event start time is not less than an imminence threshold, the control circuitry 604 may continue at 899 by concluding process 800. One skilled in the art would appreciate that the amount of time before the next event may be compared to the imminence threshold in a less than or equal comparison in the same way as described above.

As used herein, an "imminence threshold" is defined to mean an amount of time between the current time and an event start time necessary for the control circuitry 604 to deem that event start imminent. For example, when determining whether to continue playback of a media asset notwithstanding receiving a suspend command, control circuitry 604 may determine that the suspend command was issued at a time when an event start is imminent per the imminence threshold and infer that the suspend command was issued because the event start is imminent. For example, the control circuitry 604 may receive a suspend command at 6:00 PM and determine that a meeting on the user's calendar at 6:30 PM is imminent, according to an imminence threshold set to 45 minutes. On other hand, control circuitry 604 may determine that the suspend command was issued without an imminent event start time and infer that the suspend command was unrelated to any event start. For example, control circuitry 604 may receive a suspend command at 5:00 PM and determine that there are no events in the user's calendar with a start time on or before 5:45 PM and therefore no events have an imminent start time according to an imminence threshold set to 45 minutes. In some embodiments, the control circuitry 604 may be hard coded with an imminence threshold. In other embodiments, the control circuitry 604 may store a modifiable imminence threshold. The control circuitry 604 may also retrieve an imminence threshold from an external source; e.g., a user profile stored on a remote server may contain the imminence threshold.

Further, the control circuitry 604 may allow the user to configure the imminence threshold; e.g., the control circuitry 604 may provide a user interface for setting the imminence threshold.

It should be noted that process 850A or any step thereof could be performed on, or provided by, any of the devices shown in FIGS. 6-7. For example, process 850A may be executed by control circuitry 604 (FIG. 6) as instructed by a media guidance application implemented on a user device (e.g., user equipment devices 702, 704, and/or 706 (FIG. 7)) in order to determine whether a next event is delayed. In addition, one or more steps of process 850A may be incorporated into or combined with one or more steps of any other process or embodiment described herein.

Figure 10:
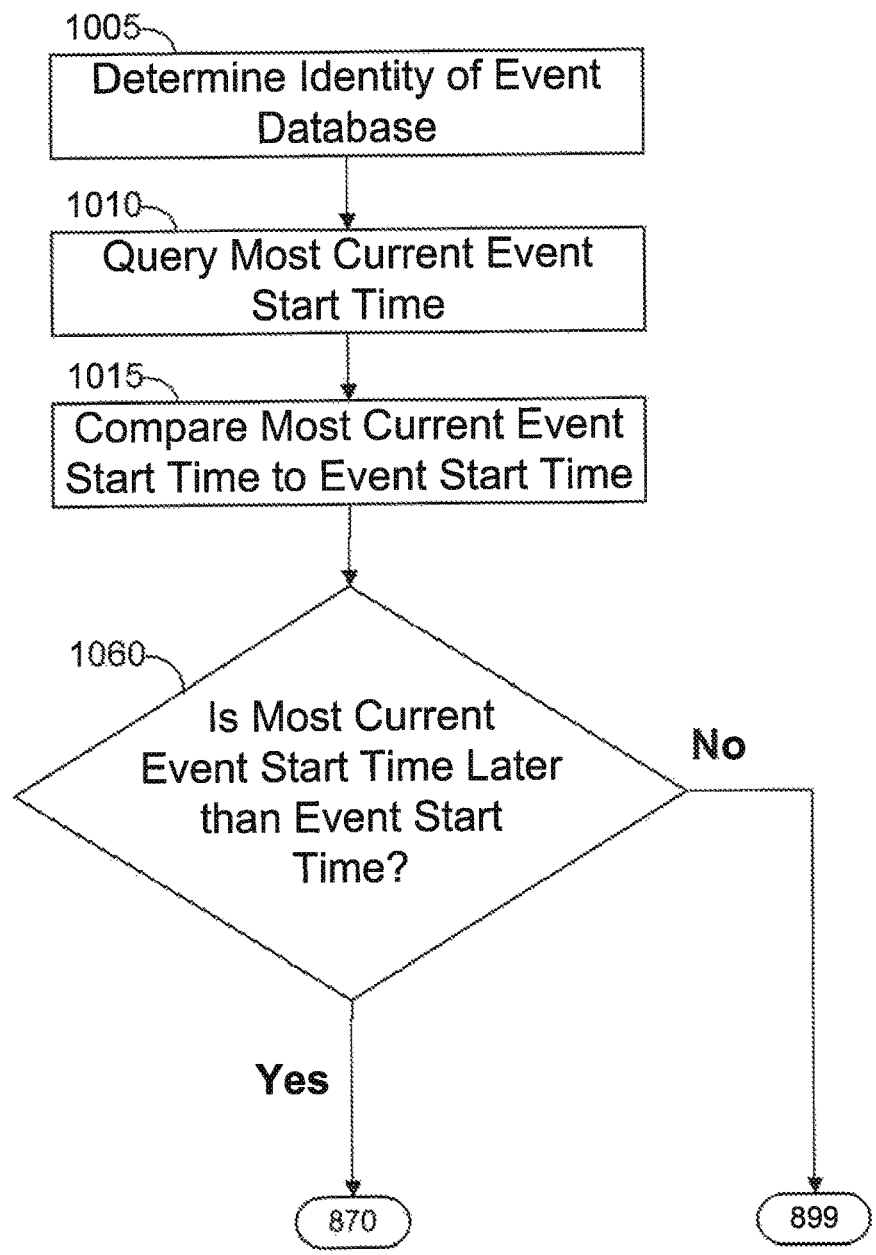
FIG. 10 depicts an illustrative flowchart of a process for determining whether a next event is delayed, in accordance with some embodiments of the disclosure.

FIG. 10 depicts an illustrative flowchart of a process for determining whether a next event is delayed, in accordance with some embodiments of the disclosure. In response to determining that the user is imminently scheduled to attend the next event, the control circuitry 604 may determine whether the event start time is delayed according to process 850A by proceeding to 1005 where the control circuitry 604 determines an identity of an event database associated with the next event. For example, control circuitry 604 may determine the identity of an event database in accordance with the description of FIG. 19.

The control circuitry 604 continues at 1010 by querying, using the identity, the event database as to a most current event start time. For example, control circuitry 604 may query the event database in accordance with the description of FIG. 20.

Process 850A continues at 1015, where the control circuitry 604 may compare the most current event start time to the event start time.

Process 850A may continue at 1060 where the control circuitry 604 may determine, based on the comparing of the most current event start time to the event start time, whether the most current event start time is later than the event start time. If the control circuitry 604 determines that the most current event start time is later than the event start time then the control circuitry 604 may continue process 800 at 870. But if the control circuitry 604 determines that the event start time is not later than the event start time then the control circuitry 604 may conclude process 800 at 899.

As used herein, the "most current event start time" is defined to mean a start time associated with the next event that is retrieved from the more current details associated with an event. For example, the control circuitry 604 may retrieve calendar information from a user's calendar as stored on the user's mobile device and, using that information, may determine a next event that is a meeting on the user's calendar with a 6:30 PM scheduled start time. The control circuitry 604 may then locate more current details associated with the same meeting showing a most current event start time of 7:30 PM. Based on the later start time stored in the most current event start time, the control circuitry 604 may infer that the next event was delayed.

It should be noted that process 850B or any step thereof could be performed on, or provided by, any of the devices shown in FIGS. 6-7. For example, process 850B may be executed by control circuitry 604 (FIG. 6) as instructed by a media guidance application implemented on a user device (e.g., user equipment devices 702, 704, and/or 706 (FIG. 7)) in order to determine whether a next event is delayed. In addition, one or more steps of process 850B may be incorporated into or combined with one or more steps of any other process or embodiment described herein.

Figure 11:
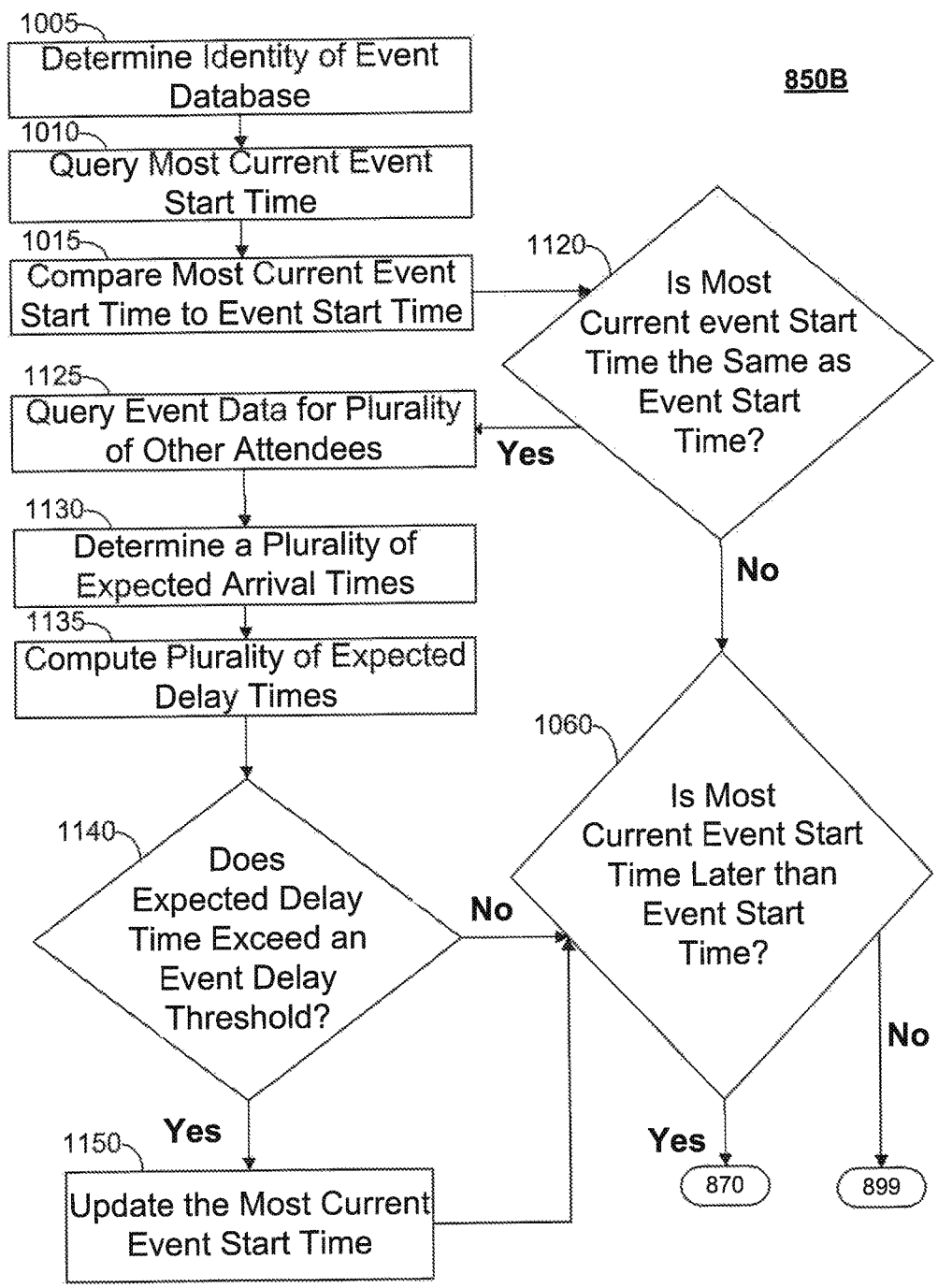
FIG. 11 depicts another illustrative flowchart of a process for determining whether a next event is delayed, in accordance with some embodiments of the disclosure.

FIG. 11 depicts an illustrative flowchart of a process for determining whether a next event is delayed, in accordance with some embodiments of the disclosure.

As in process 850A, the control circuitry 604 may respond to determining that the user is imminently scheduled to attend the next event by proceeding to 1005 where the control circuitry 604 determines an identity of an event database associated with the next event. As described with respect to process 850A, control circuitry 604 proceeds with querying the most current event start time 1010 and comparing the most current event start time to the event start time 1015.

In process 850B, control circuitry 604 proceeds to 1120 by determining whether there is a time difference between the most current event start time and the event start time.

If the control circuitry 604 determines there is a difference in time, control circuitry 604 proceeds to 1060 as described in FIG. 10.

If the control circuitry 604 determines there is no time difference between the most current event start time and the event start time, the control circuitry 604 proceeds to 1125 by querying the event database as to a plurality of other attendees associated with the next event.

At 1130, the control circuitry 604 determines a plurality of expected event arrival times associated with the plurality of other attendees associated with the next event.

For example, the control circuitry 604 may access GPS coordinates associated with one or more of the other attendees to determine the other attendees' locations. For example, the control circuitry 604 may query smartphones associated with one or more of the other attendees to obtain the GPS coordinates. Those locations may be compared to the location of the next event and the control circuitry 604 may use that information to determine the expected arrival time for one or more of the other attendees. Using the expected arrival times associated with the other attendees, the control circuitry 604 may infer that an event is delayed. In another embodiment, the locations of the other attendees may be unknown to the control circuitry 604, but the control circuitry 604 may be able to query from a remote data source the expected arrival times associated with the plurality of other attendees. For example, a system may be in place to periodically query each attendee as to an expected arrival time and update a central data source to distribution to meeting attendees. Such querying could be transparent or interactive with the other attendees. In some embodiments, a security system within a corporate location may use facial recognition to track the locations of a building's occupants. The control circuitry 604 may access such a system to obtain the locations or expected arrival times of a plurality of meeting attendees.

The control circuitry 604 continues process 850B at 1135 computing a plurality of expected event delay amounts associated with the plurality of other attendees. For example, the control circuitry 604 may subtract each of the plurality of expected event arrival times from the event start time to compute each of the plurality of expected event delay amounts.

At 1140, the control circuitry 604 determines whether one or more of the plurality of expected event delay amounts exceeds an event delay threshold. In response to determining that none of the plurality of expected event delay amounts exceeds the event delay threshold, the control circuitry 604 proceeds to 1060 as described with respect to FIG. 10 to determine whether the most current event start time is later than the event start time.

In response to determining that one or more of the plurality of expected event delay amounts exceeds the event delay threshold, the control circuitry 604 proceeds to 1150 by updating the most current event start time based on the plurality of expected event delay amounts. For example, the control circuitry 604 may determine that three attendees other than the user are attending the next event, which is currently scheduled to start at 6:30 PM. In this example, the control circuitry 604 may determine that the attendees are expected to arrive at the next event at 6:30 PM, 6:40 PM, and 7:30 PM respectively. Hence, the control circuitry 604 may determine that the expected delay amounts are 0 minutes, 10 minutes, and 60 minutes in this example. In this example, the control circuitry 604 may also determine that the event delay threshold is 30 minutes and, because the 60-minute delay exceeds the event delay threshold, the control circuitry 604 will update the most current event start time to 7:30 PM to account for the delayed attendees.

The process 850B may continue at 1060, where the control circuitry 604 determines whether the most current event start time is later than the event start time as described with respect to FIG. 10.

As used herein, an "event delay threshold" is defined to mean an amount of time between the most current event start time and the event start time necessary for the control circuitry 604 to deem that event delayed such that the control circuitry 604 will continue playback of the media asset notwithstanding receiving the suspend command. For example, when determining whether to continue playback of a media asset notwithstanding receiving a suspend command, the control circuitry 604 may determine that the most current event start time is 6:40 PM and the event start time from the user's profile is 6:30 PM, which corresponds to a ten-minute delay. If the event delay threshold is set to, for example, 15 minutes, the control circuitry 604 may determine that a ten-minute delay is not sufficient for the control circuitry 604 to continue playback. In a similar scenario, the control circuitry 604 may determine the most current event start time is 7:30 PM, making the delay amount 1 hour, which meets and exceeds the event delay threshold, which is 15 minutes in this example. In some embodiments, the control circuitry 604 may be hard coded with an event delay threshold. In other embodiments, the control circuitry 604 may store a modifiable event delay threshold. The control circuitry 604 may also retrieve an event delay threshold from an external source; e.g., a user profile stored on a remote server may contain the event delay threshold. Further, the control circuitry 604 may allow the user to configure the event delay threshold; e.g., the control circuitry 604 may provide a user interface for setting the event delay threshold. One skilled in the art would appreciate that the comparison to the event delay threshold may be a less than or equal comparison in the same way as described above.

It should be noted that process 870A or any step thereof could be performed on, or provided by, any of the devices shown in FIGS. 6-7. For example, process 870A may be executed by control circuitry 604 (FIG. 6) as instructed by a media guidance application implemented on a user device (e.g., user equipment devices 702, 704, and/or 706 (FIG. 7)) in order to continue to generate display of a media asset notwithstanding receiving a suspend command. In addition, one or more steps of process 870A may be incorporated into or combined with one or more steps of any other process or embodiment described herein.

Figure 12:
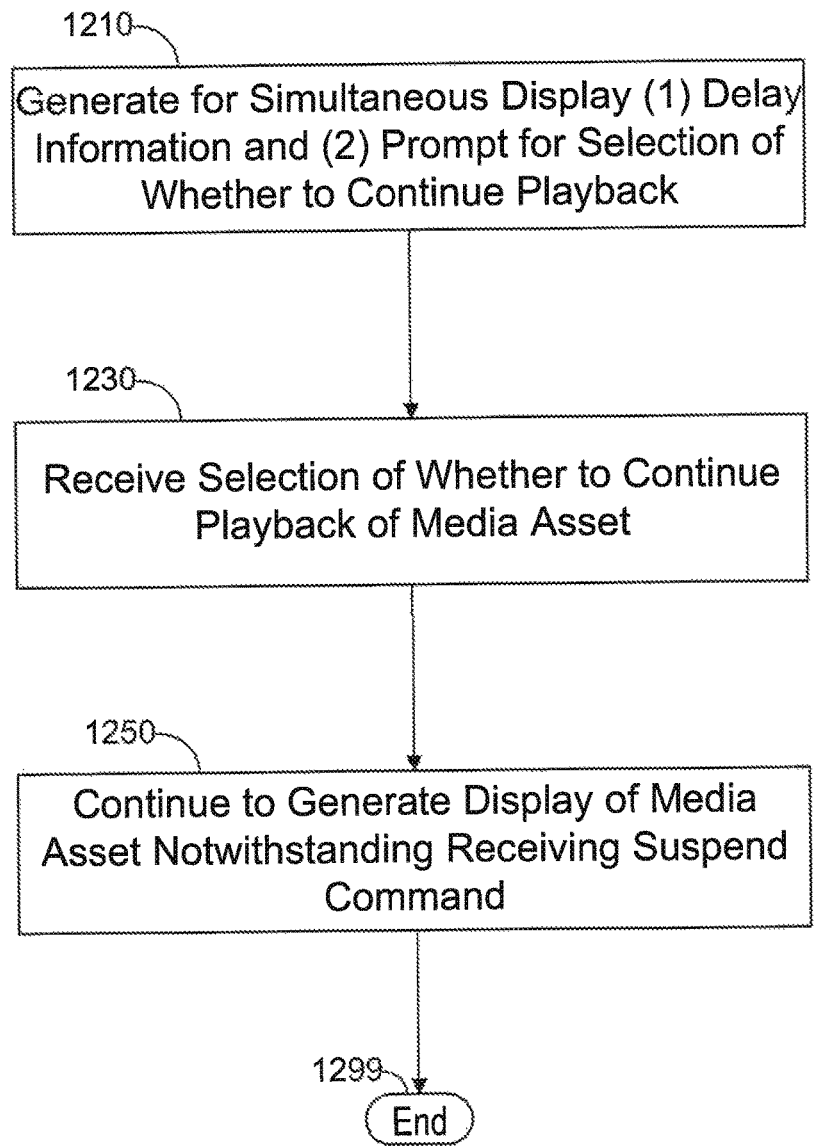
FIG. 12 depicts an illustrative flowchart of a process for continuing to generate display of a media asset notwithstanding receiving a suspend command, in accordance with some embodiments of the disclosure.

FIG. 12 depicts an illustrative flowchart of a process for continuing to generate display of a media asset notwithstanding receiving a suspend command, in accordance with some embodiments of the disclosure.

In response to determining that the most current event start is delayed, the control circuitry 604 may continue with process 870A by generating for simultaneous display to the user (1) information indicating that the most current event start time is later than the event start time and (2) a selectable option for continuing to generate for display the media asset notwithstanding receipt of the suspend command at 1210. For example, FIG. 2 depicts an exemplary presentation of information indicating that the most current event start time is later than the event start time at 210, along with a selectable option 220 for continuing to generate for display the media asset notwithstanding receipt of the suspend command.

At 1230, the control circuitry 604 may receive a selection from the user of the selectable option which indicates the control circuitry 604 should continue playback of the media asset. For example, control circuitry 604 may present two selectable options 220 and 230 to a user to allow the user to decide whether to continue playback of the media asset 101.

In some embodiments, the control circuitry 604 may present the selectable option 220 ("Yes," which indicates continue watching) as a default option. In such an embodiment, the control circuitry 604 may wait for a predetermined length of time before using the default option in lieu of receiving a selection from the user. For example, the control circuitry 604 may present the selectable options 220 and 230 to the user and wait for five-seconds for the user to make a selection. If the user makes a selection, the control circuitry 604 would respond to the selection accordingly. If the user does not make a selection, the control circuitry 604 may stop waiting for the selection and continuing processing in a manner consistent with the user having selection the "Yes" option 220. In some embodiments, the control circuitry 604 may determine which between the selection options 220 and 230 should be the default option. For example, the control circuitry 604 may determine that the next event is associated with the user's professional calendar and default to the "No" option 230 which results in a suspension of playback. Alternatively, the control circuitry 604 may base the determination of which option is the default option on the current time and the next event time.

In response to receiving the selection from the user of the selectable option, e.g., a "Yes" box 220, the control circuitry 604 may continue to generate for display the media asset 101 notwithstanding receipt of the suspend command at 1250.

The control circuitry 604 may conclude process 870A at 1299 and continue process 800 after 870 as described with respect to FIG. 8.

It should be noted that process 870B or any step thereof could be performed on, or provided by, any of the devices shown in FIGS. 6-7. For example, process 870B may be executed by control circuitry 604 (FIG. 6) as instructed by a media guidance application implemented on a user device (e.g., user equipment devices 702, 704, and/or 706 (FIG. 7)) in order to continue to generate display of a media asset notwithstanding receiving a suspend command. In addition, one or more steps of process 870B may be incorporated into or combined with one or more steps of any other process or embodiment described herein.

Figure 13:
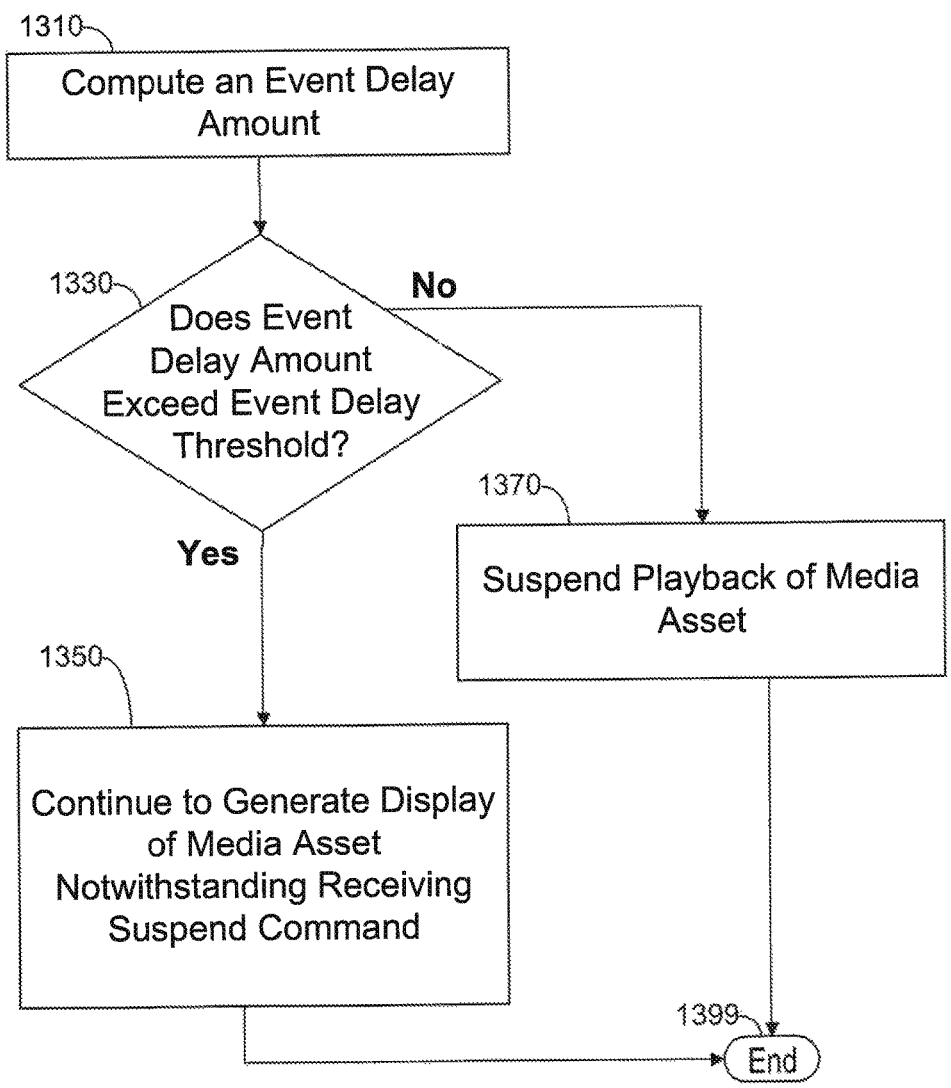
FIG. 13 depicts another illustrative flowchart of a process for continuing to generate display of a media asset notwithstanding receiving a suspend command, in accordance with some embodiments of the disclosure.

FIG. 13 depicts an illustrative flowchart of a process for continuing to generate display of a media asset notwithstanding receiving a suspend command, in accordance with some embodiments of the disclosure.

In response to determining that the most current event start is delayed, the control circuitry 604 may continue with process 870B by computing an event delay amount at 1310. For example, the control circuitry 604 may compare the most current event start time to the event start time to compute an event delay amount.

At 1330, the control circuitry 604 determines whether the event delay amount exceeds an event delay threshold.

If the control circuitry 604 determines the event delay amount exceeds the event delay threshold, then the control circuitry 604 continues to generate for display the media asset notwithstanding receipt of the suspend command at 1350.

But if the control circuitry 604 determines the event delay amount does not exceed the event delay threshold, the control circuitry 604 suspends playback of the media asset at 1370. For example, if a meeting on the user's calendar was delayed five minutes from the event start time stored in the user's personal calendar, the control circuitry 604 may consider this delay too little to continue playback. In such an example, the event delay threshold may be thirty minutes and the event delay must meet, or exceed, thirty minutes for the control circuitry 604 to continue playback. In some embodiments, the control circuitry 604 may be hard coded with an event delay threshold.

The control circuitry 604 may conclude process 870B at 1399 and continue process 800 after 870 as described with respect to FIG. 8.

It should be noted that process 870C or any step thereof could be performed on, or provided by, any of the devices shown in FIGS. 6-7. For example, process 870C may be executed by control circuitry 604 (FIG. 6) as instructed by a media guidance application implemented on a user device (e.g., user equipment devices 702, 704, and/or 706 (FIG. 7)) in order to continue to generate display of a media asset notwithstanding receiving a suspend command. In addition, one or more steps of process 870C may be incorporated into or combined with one or more steps of any other process or embodiment described herein.

Figure 14:
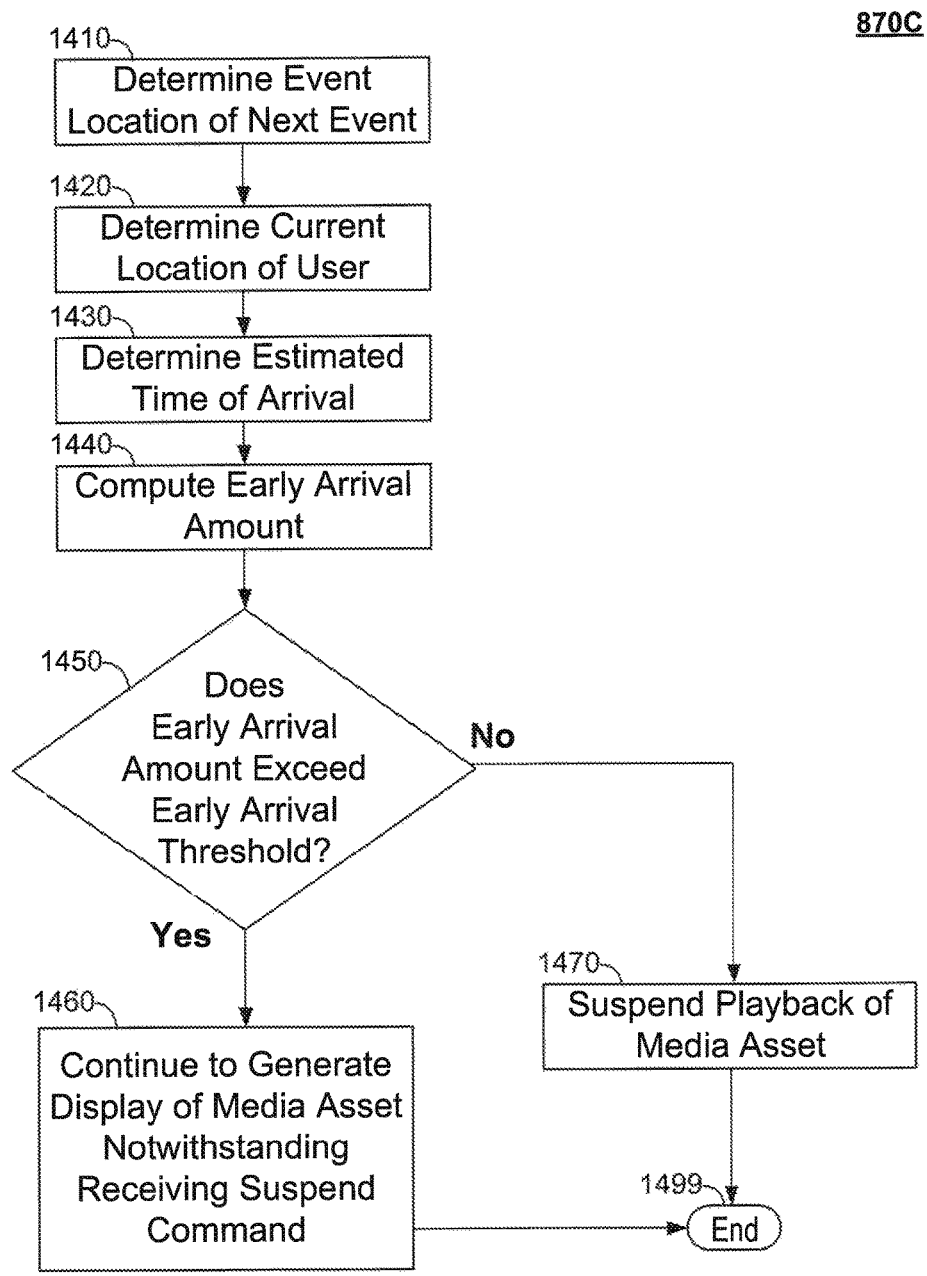
FIG. 14 depicts another illustrative flowchart of a process for continuing to generate display of a media asset notwithstanding receiving a suspend command, in accordance with some embodiments of the disclosure.

FIG. 14 depicts an illustrative flowchart of a process for continuing to generate display of a media asset notwithstanding receiving a suspend command, in accordance with some embodiments of the disclosure. In response to determining that the most current event start is delayed, the control circuitry 604 may continue with process 870C by determining an event location of the next event at 1410. For example, the control circuitry 604 may access event details from the calendar information that includes an address, GPS coordinates, i.e., latitude and longitude, landmark description, video conference number, teleconference number, URL associated with the meeting, or other information indicating where a meeting may be attended.

At 1420, the control circuitry 604 may continue by determining a current location of the user.

At 1430, the control circuitry 604 may determine an estimated time of arrival based on the event location of the next event and the current location of the user. For example, the control circuitry 604 may access a service that provides an estimated time of travel between two locations. Many such services exist, for example, many smartphones provide applications capable of providing an estimated travel time based on the location of the smartphone and the destination location.

Process 870C continues at 1440, where the control circuitry 604 compares the estimated time of arrival to the most current event start time to compute an early arrival amount.

At 1450, the control circuitry 604 determines whether the early arrival amount exceeds an early arrival threshold.

If the control circuitry 604 determines that the early arrival amount exceeds the early arrival threshold, the control circuitry 604 may continue to generate for display the media asset notwithstanding receipt of the suspend command at 1460.

If the control circuitry 604 determines that the early arrival amount does not exceed the early arrival threshold, the control circuitry 604 may suspend playback of the media asset at 1470. The control circuitry 604 may conclude process 870C at 1499 and continue process 800 after 870 as described with respect to FIG. 8.

As used herein, an "early arrival threshold" is defined to mean an amount of time between the most current event start time and the estimated time of arrival of the user necessary for the control circuitry 604 to continue playback of the media asset notwithstanding receiving the suspend command. For example, it may be that, despite a dinner meeting moving from 6:30 PM to 7:30 PM, the user does not have an additional hour based on the necessary travel time. For example, the control circuitry 604 may estimate that the user will arrive to the dinner meeting at 7:25 PM based on necessary travel time, and the control circuitry 604 may consider the five-minute arrival window too small to continue playback. In some embodiments, the control circuitry 604 may be hard coded with an early arrival threshold. In other embodiments, the control circuitry 604 may store a modifiable early arrival threshold. The control circuitry 604 may also retrieve an early arrival threshold from an external source; e.g., a user profile stored on a remote server may contain the early arrival threshold. Further, the control circuitry 604 may allow the user to configure the early arrival threshold; e.g., the control circuitry 604 provide a user interface for setting the event delay threshold. One skilled in the art would appreciate that the comparisons to the early arrival threshold may be a less than or equal comparison in the same way as described above.

It should be noted that process 892A or any step thereof could be performed on, or provided by, any of the devices shown in FIGS. 6-7. For example, process 892A may be executed by control circuitry 604 (FIG. 6) as instructed by a media guidance application implemented on a user device (e.g., user equipment devices 702, 704, and/or 706 (FIG. 7)) in order to delay suspension of playback of a media asset. In addition, one or more steps of process 892A may be incorporated into or combined with one or more steps of any other process or embodiment described herein.

Figure 15:
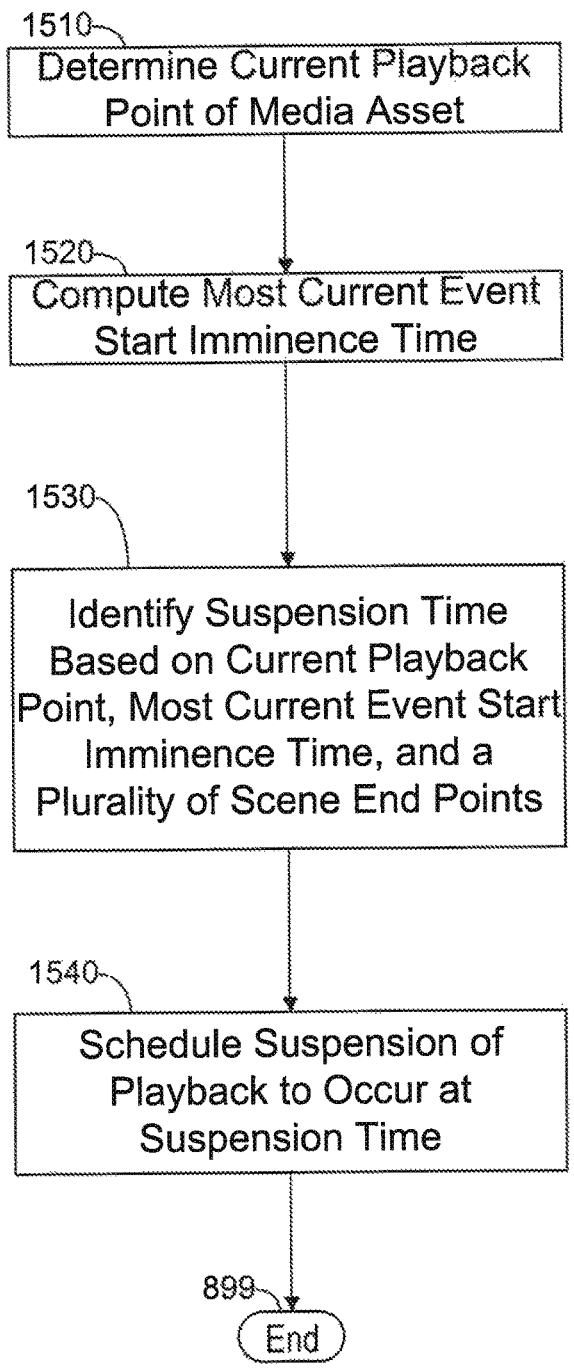
FIG. 15 depicts an illustrative flowchart of a process for delaying suspension of playback of a media asset, in accordance with some embodiments of the disclosure.

FIG. 15 depicts an illustrative flowchart of a process for delaying suspension of playback of a media asset, in accordance with some embodiments of the disclosure. In one embodiment, control circuitry 604 delays suspension of playback of a media asset after continuing playback of the media asset with 892A. Process 892A begins at 1510, where control circuitry 604 determines a current playback point of the media asset.

The control circuitry 604 computes a most current event start imminence time based on the most current event start time and the imminence threshold as 1520.

As used herein, an "most current event start imminence time" is defined to mean the time at which the control circuitry 604 considers the next event imminent, according to the imminence threshold, with respect to the next event's most current event start time. For example, when determining whether to continue playback of a media asset notwithstanding receiving a suspend command, the control circuitry 604 may determine that the suspend command was issued at a time when an event start is imminent per the imminence threshold and infer that the suspend command was issued because the event start is imminent. For example, a control circuitry 604 may receive a suspend command at 6:00 PM and determine that a meeting on the user's calendar at 6:30 PM is imminent according to an imminence threshold set to 45 minutes. During processing, the control circuitry 604 may also determine that the most current event start time of the next event is 7:30 PM. Using the imminence threshold, e.g., 45 minutes, and the most current event start time, e.g., 7:30 PM, the control circuitry 604 can determine that, in this example, the most current event start imminence time is 6:45 PM, i.e., the time at which the most current event start time is imminent.

Process 892A continues at 1530 with the control circuitry 604 identifying a suspension time based on the current playback point, the current time, the most current event imminence time, and a plurality of scene end points.

At 1540, the control circuitry 604 schedules suspension of playback of the media asset to occur at the suspension time. The control circuitry 604 may conclude process 892A at 899, i.e., by continuing process 800 after 892 as described with respect to FIG. 8.

It should be noted that process 1530 or any step thereof could be performed on, or provided by, any of the devices shown in FIGS. 6-7. For example, process 1530 may be executed by control circuitry 604 (FIG. 6) as instructed by a media guidance application implemented on a user device (e.g., user equipment devices 702, 704, and/or 706 (FIG. 7)) in order to identify a suspension time based on a current playback point. In addition, one or more steps of process 1530 may be incorporated into or combined with one or more steps of any other process or embodiment described herein.

Figure 16:
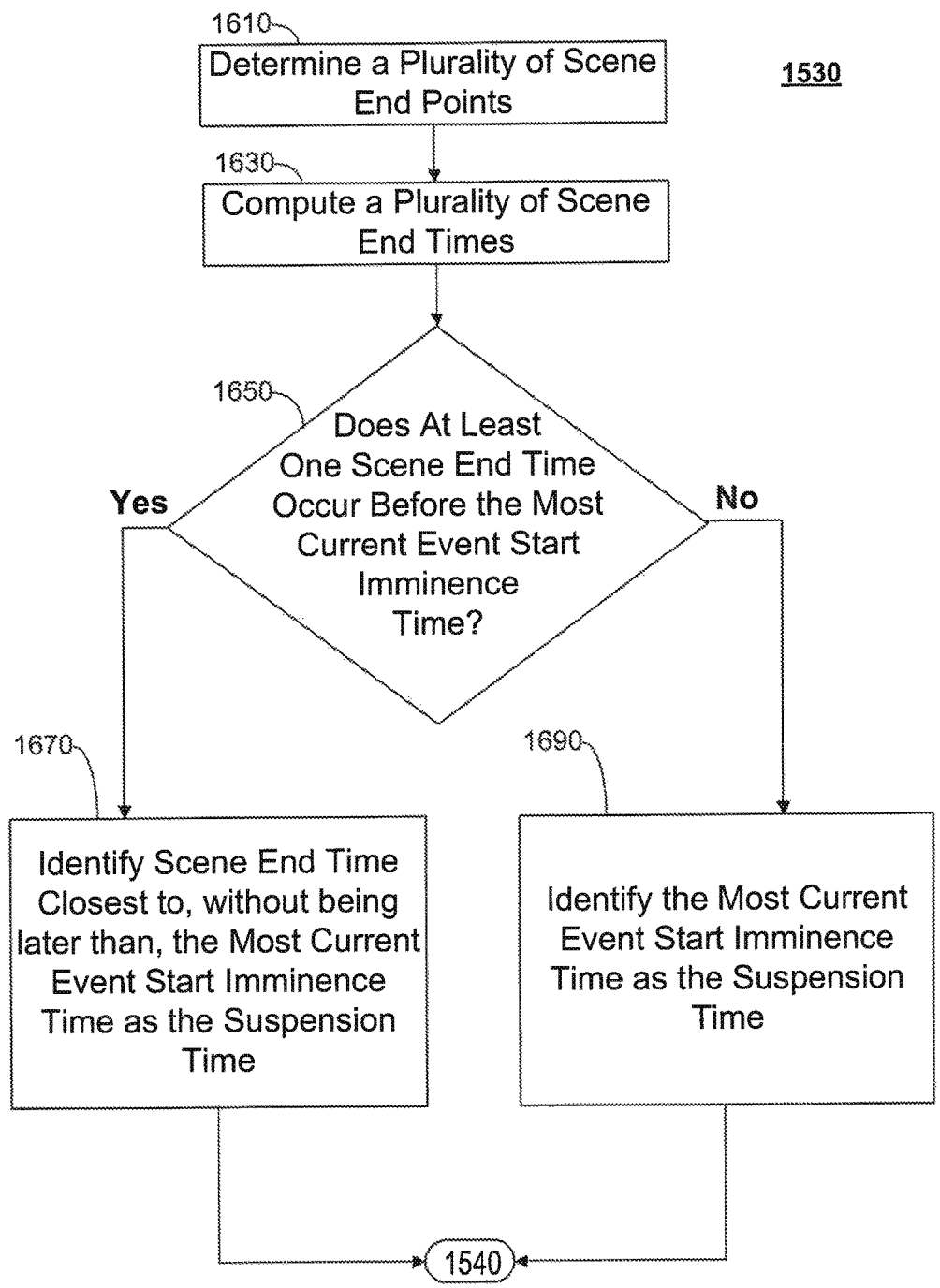
FIG. 16 depicts an illustrative flowchart of a process for identifying a suspension time based on a current playback point, a most current event start imminence time, and a plurality of scene end points, in accordance with some embodiments of the disclosure.

FIG. 16 depicts an illustrative flowchart of a process for identifying a suspension time based on a current playback point, a most current event start imminence time, and a plurality of scene end points, in accordance with some embodiments of the disclosure. In one embodiment, control circuitry 604 identifies a suspension time based on the current playback point, the current time, the most current event imminence time, and a plurality of scene end points using process 1530.

Process 1530 begins at 1610, where control circuitry 604 analyzes the media asset to determine the plurality of scene end points.

For example, the control circuitry 604 may identify metadata corresponding to the media asset that identifies scenes including scene start points, scene end points, and/or scene durations. In a further example, the control circuitry 604 may analyze the content of the media asset to identify content that corresponds with a scene end point (e.g., an audio-visual presentation may contain a three-second black screen with no perceptible sound which corresponds with the end of a scene).

At 1630, the control circuitry 604 continues by computing a plurality of scene end times based on the current time, the current playback point, and the plurality of scene end points. The control circuitry 604 may then compute a plurality of scene end times based on the current time, current playback point, and the plurality of scene end points.

For example, the control circuitry 604 may determine that the media asset contains three scenes ending at playback points of 15:00, 30:00, and 45:00 into the media asset and the current playback point is 33:09 into the media asset. In this example, the control circuitry 604 may determine that a scene ending 11 minutes and 51 seconds from the current time will end at approximately 6:12 PM and determine that the scene end times at the playback points 15:00 and 30:00 occurred in the past.

Process 1530 may continue at 1650, where the control circuitry 604 determines whether there is at least one scene end time among the plurality of scene end times that occurs before the most current event imminence time.

If the control circuitry 604 determines there is at least one scene end time among the plurality of scene end times that occurs before the most current event imminence time, the process 1530 continues at 1670 where the control circuitry 604 identifies, as the suspension time, the scene end time among the plurality of scene end times closest to the most current event imminence time without occurring after the most current event imminence time.

Carrying through with the prior example, the scene end time at 6:12 PM is the closest to the most current event start imminence time of 6:30 PM. If the control circuitry 604 determines there are no scene end times among the plurality of scene end times that occur before the most current event imminence time, process 1530 continues at 1690 where the control circuitry 604 identifies, as the suspension time, the most current event imminence time.

The control circuitry 604 may conclude process 1530 by continuing process 892A at 1540 as described with respect to FIG. 15.

It should be noted that process 892B or any step thereof could be performed on, or provided by, any of the devices shown in FIGS. 6-7. For example, process 892B may be executed by control circuitry 604 (FIG. 6) as instructed by a media guidance application implemented on a user device (e.g., user equipment devices 702, 704, and/or 706 (FIG. 7)) in order to delay suspension of playback of a media asset. In addition, one or more steps of process 892B may be incorporated into or combined with one or more steps of any other process or embodiment described herein.

Figure 17:
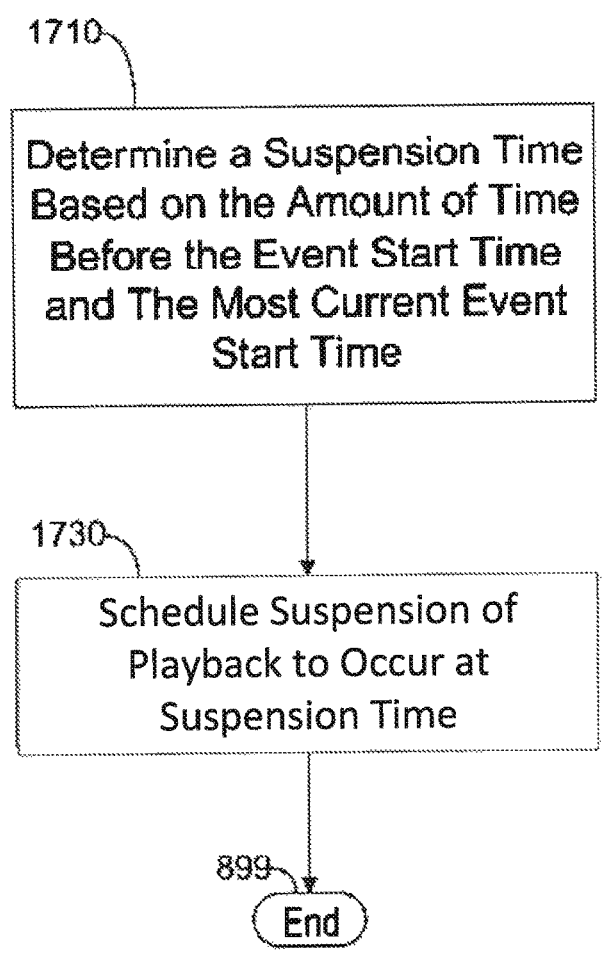
FIG. 17 depicts another illustrative flowchart of a process for delaying suspension of playback of a media asset, in accordance with some embodiments of the disclosure.

FIG. 17 depicts an illustrative flowchart of a process for delaying suspension of playback of a media asset, in accordance with some embodiments of the disclosure. In one embodiment, control circuitry 604 delays suspension of playback of a media asset after continuing playback of the media asset with 892B.

Process 892B begins at 1710, where control circuitry 604 determines a suspension time based on the amount of time before the event start time and the most current event start time.

For example, the control circuitry 604 may receive a suspend command from the user at 6:00 PM and determine that the user has a meeting originally scheduled for 6:30 PM that was delayed to 7:30 PM. In this example, the control circuitry 604 may infer that it should suspend playback of the media asset 30 minutes before the event. Thus, the control circuitry 604 could determine the suspension time is 7:00 PM, based on the most current event start time (7:30 PM) and the amount of time before the event start time (30 minutes).

Process 892B continues at 1730, where the control circuitry 604 schedules the suspension of playback of the media asset to occur at the suspension time. Thus, the control circuitry 604 may provide a snooze-like function by determining an amount of delay between the event start time and the most current event start time and delay suspension of playback for that amount of delay.

The control circuitry 604 may conclude process 892B at 899, i.e., by continuing process 800 after 892 as described with respect to FIG. 8.

It should be noted that process 930 or any step thereof could be performed on, or provided by, any of the devices shown in FIGS. 6-7. For example, process 930 may be executed by control circuitry 604 (FIG. 6) as instructed by a media guidance application implemented on a user device (e.g., user equipment devices 702, 704, and/or 706 (FIG. 7)) in order to determine a next event from calendar information in a profile. In addition, one or more steps of process 930 may be incorporated into or combined with one or more steps of any other process or embodiment described herein.

Figure 18:
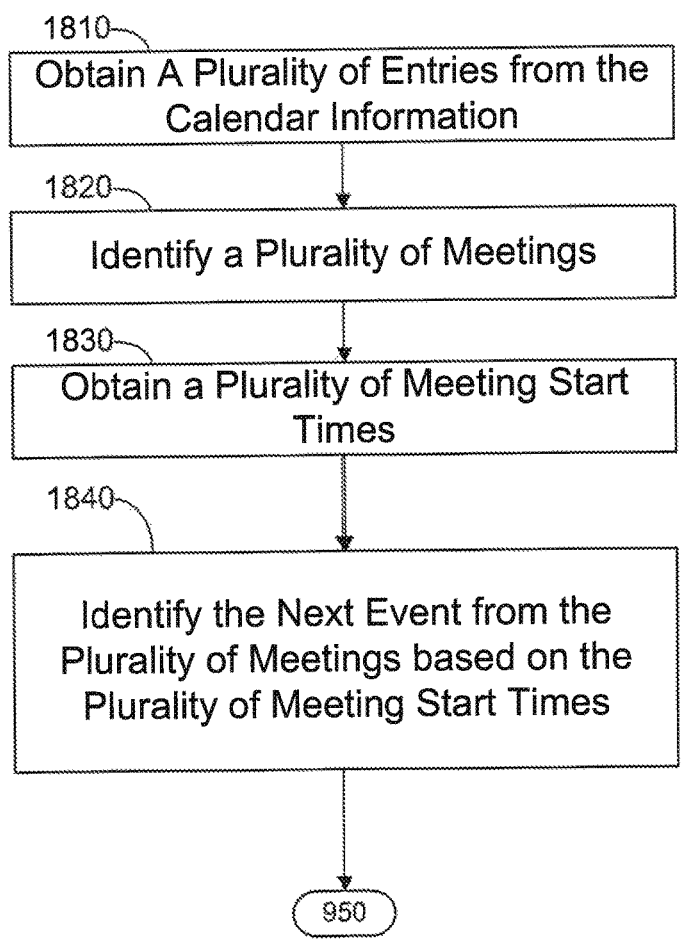
FIG. 18 depicts an illustrative flowchart of a process for determining a next event from calendar information in a profile, in accordance with some embodiments of the disclosure.

FIG. 18 depicts an illustrative flowchart of a process for determining a next event from calendar information in a profile, in accordance with some embodiments of the disclosure. In one embodiment of the disclosure, control circuitry 604 determines the next event from calendar information in the profile according to the process 930 as depicted in FIG. 18.

Process 930 begins at 1810 where the control circuitry 604 obtains the plurality of entries from the calendar information in the profile. For example, control circuitry 604 may obtain a plurality of events from the user's calendar containing one or more meetings and one or more non-meetings. In one example, the control circuitry 604 may determine that the calendar information contains both meetings and reminders unrelated to meetings (e.g., a reminder to buy a birthday gift).

Process 930 continues at 1820 where the control circuitry 604 analyzes the plurality of entries to identify a plurality of meetings.

At 1830, the control circuitry 604 may analyze the plurality of meetings to obtain a plurality of meeting start times associated with the plurality of meetings.

Process 930 may continue at 1840 where the control circuitry 604 may identify the next event from the plurality of meetings based on the plurality of meeting start times. For example, the control circuitry 604 may determine that a user's profile contains three events in the calendar information: a reminder to purchase a birthday gift, a dinner meeting for 7:30 PM on the current day, and a movie date for the next day at 5:00 PM. The control circuitry 604 may use metadata about the events (e.g., locations, start times, end times, durations, notes) to determine which among the events is a meeting and which meeting occurs next in time. In this example, the dinner meeting at 7:30 PM is the next meeting and the media guidance application would, therefore, identify this meeting as the next event.

The control circuitry 604 may conclude process 930 by continuing process 830 at 950 as described with respect to FIG. 9.

It should be noted that process 1005 or any step thereof could be performed on, or provided by, any of the devices shown in FIGS. 6-7. For example, process 1005 may be executed by control circuitry 604 (FIG. 6) as instructed by a media guidance application implemented on a user device (e.g., user equipment devices 702, 704, and/or 706 (FIG. 7)) in order to determine an identity of an event database. In addition, one or more steps of process 1005 may be incorporated into or combined with one or more steps of any other process or embodiment described herein.

Figure 19:
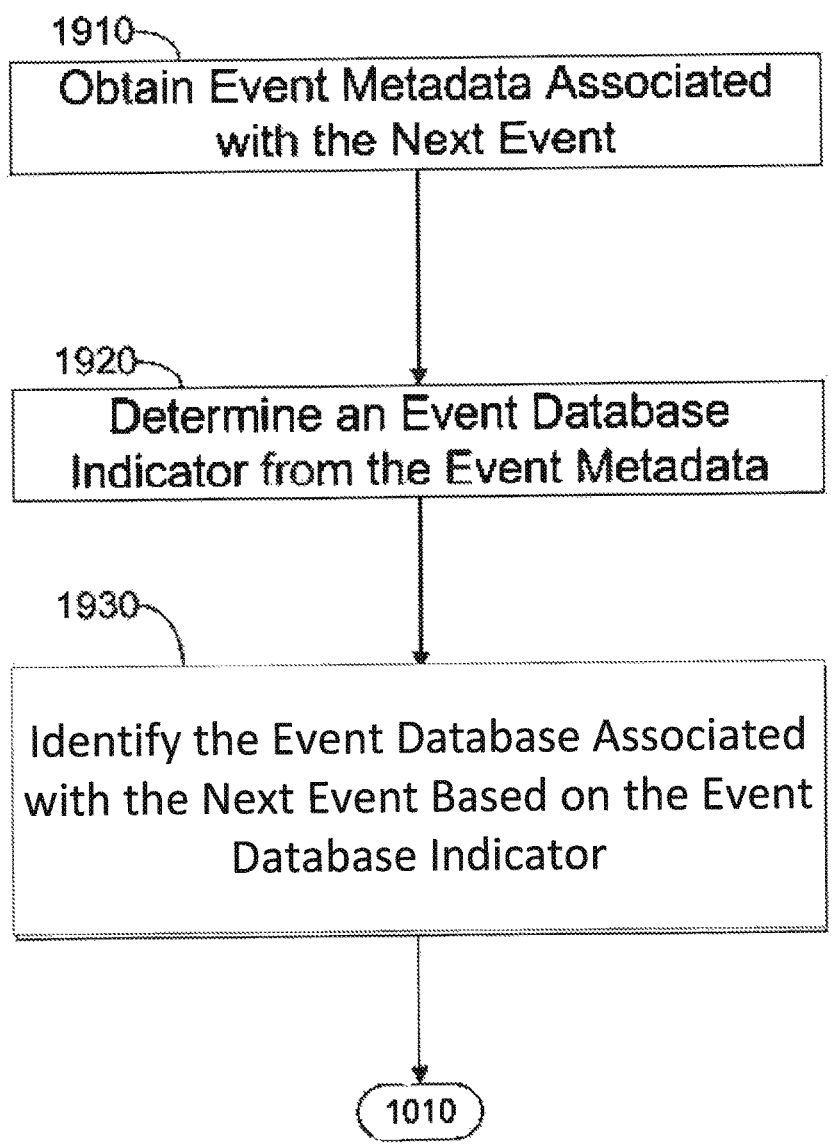
FIG. 19 depicts an illustrative flowchart of a process for determining an identity of an event database, in accordance with some embodiments of the disclosure.

FIG. 19 depicts an illustrative flowchart of a process for determining an identity of an event database, in accordance with some embodiments of the disclosure. In one embodiment of the disclosure, control circuitry 604 determines the identify of an event database according to the process 1005 as depicted in FIG. 19.

Process 1005 begins at 1910 by obtaining event metadata associated with the next event.

The control circuitry 604 continues at 1920 and determines an event database indicator based on the event metadata.

The control circuitry 604 identifies the event database associated with the next event based on the event database indicator at 1930. For example, the control circuitry 604 may determine that the next event is a dinner meeting associated with the user's work email address, and the control circuitry 604 may determine that the event database is the employer's Microsoft Exchange server, a popular corporate email and calendaring server. In another example, the control circuitry 604 may determine the next event is a concert associated with ticket provider, such as Ticketmaster, and determine that the event database is a web service associated with the ticket provider.

The control circuitry 604 may conclude process 1005 by continuing process 850A or 850B at 1010 as described with respect to FIGS. 10 and 11.

It should be noted that process 1010 or any step thereof could be performed on, or provided by, any of the devices shown in FIGS. 6-7. For example, process 1010 may be executed by control circuitry 604 (FIG. 6) as instructed by a media guidance application implemented on a user device (e.g., user equipment devices 702, 704, and/or 706 (FIG. 7)) in order to query a most current event start time. In addition, one or more steps of process 1010 may be incorporated into or combined with one or more steps of any other process or embodiment described herein.

FIG. 20 depicts an illustrative flowchart of a process for querying a most current event start time. In one embodiment of the disclosure, control circuitry 604 queries the most current event start time of the next event using process 1010 as depicted in FIG. 20.

Process 1010 begins at 2010 where the control circuitry 604 obtains an event identifier from the event metadata. For example, the control circuitry 604 may use metadata associated with the next event to obtain a unique identifier (UID), a globally unique identifier (GUID), a universally unique identifier (UUID), or a unique string of characters to identify an entry in a database containing information about the next event.

The control circuitry 604 continues process 1010 at 2020 where it identifies a remote server associated with the event database. For example, the control circuitry 604 may identify a web service at app.ticketmaster.com when the next event is a concert associated with Ticketmaster, and the control circuitry 604 may use that web service to retrieve details of the next event including the most current event start time.

At 2030, the control circuitry 604 transmits a request to the remote server (e.g., a server that resides on another computer, another network, or at another geographic location). The control circuitry 604 includes an event identifier and a command requesting the most current event start time from the event database in that request.

At 2040, the control circuitry 604 receives, from the remote server, the most current event start time. For example, the control circuitry 604 may contact a web service using JavaScript Object Notation (JSON) formatted requests to obtain information about events. In response, the control circuitry 604 may receive event details, in response to requests, including: name, type, ID, uniform resource location, locale, postal code, time zone, address, latitude and longitude, start time, duration, end time, associate images, or other pertinent details from the web service.

The control circuitry 604 may conclude process 1010 by continuing process 850A or 850B at 1015 as described with respect to FIGS. 10 and 11.

It should be noted that the processes described with reference to FIGS. 8-20 or any step thereof could be performed on, or provided by, any of the devices shown in FIGS. 1-2 and 6-7. For example, any of the processes described with reference to FIGS. 8-20 may be executed by control circuitry 604 (FIG. 6) as instructed by control circuitry implemented on user equipment 702, 704, 706 (FIG. 7), and/or a user equipment device for playback of a media asset. In addition, one or more steps of the processes described with reference to FIGS. 8-20 may be incorporated into or combined with one or more steps of any other process or embodiment.

It is contemplated that the steps or descriptions of each of FIGS. 8-20 may be used with any other embodiment of this disclosure. In addition, the steps and descriptions described in relation to FIGS. 8-20 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 and 6-7 could be used to perform one or more of the steps in FIGS. 8-20.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 606 of FIG. 6. The processing circuitry, for instance, may be a general purpose processor, a customized integrated circuit (e.g., an ASIC), or a field-programmable gate array (FPGA) within user equipment 60, media content source 716, or media guidance data source 718. For example, a profile, as described herein, may be stored in, and retrieved from, storage 608 of FIG. 6, or media guidance data source 718 of FIG. 7. Furthermore, processing circuitry, or a computer program, may update settings of user equipment 100 stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for controlling playback of a media asset on a user equipment based on indicia that a next event is delayed from an event start time, the method comprising:
   receiving, at the user equipment, during playback of the media asset that has remaining runtime, a suspend command to suspend playback of the media asset;
   in response to receiving the suspend command, determining whether a user is imminently scheduled to attend the next event by:
   retrieving a profile corresponding to the user from a database;
   determining the next event, based on calendar information in the profile, from a plurality of entries associated with the user;
   determining the event start time of the next event;
   comparing the event start time of the next event to a current time to compute an amount of time before the event start time; and
   determining whether the amount of time is less than an imminence threshold;
   in response to determining, based on the amount of time being less than the imminence threshold, that the user is imminently scheduled to attend the next event, determining whether the event start time is delayed by:
   determining an identity of an event database associated with the next event;
   querying, using the identity, the event database as to a most current event start time;
   comparing the most current event start time to the event start time; and
   determining, based on the comparing of the most current event start time to the event start time, whether the most current event start time is later than the event start time; and
   in response to determining, based on determining that the most current event start time is later than the event start time, that the most current event start time is delayed, continuing to generate for display the media asset notwithstanding receipt of the suspend command; wherein continuing to generate for display the media asset notwithstanding receipt of the suspend command comprises: determining an event location of the next event; determining a current location of the user; determining an estimated time of arrival based on the event location of the next event and the current location of the user; comparing the estimated time of arrival to the most current event start time to compute an early arrival amount; determining whether the early arrival amount exceeds an early arrival threshold; and in response to determining that the early arrival amount exceeds the early arrival threshold, continuing to generate for display the media asset notwithstanding receipt of the suspend command.

2. The method of claim 1, wherein continuing to generate for display the media asset notwithstanding receipt of the suspend command comprises:
   generating for simultaneous display to the user (1) information indicating that the most current event start time is later than the event start time and (2) a selectable option for continuing to generate for display the media asset notwithstanding receipt of the suspend command;

receiving a selection from the user of the selectable option; and in response to receiving the selection from the user of the selectable option, continuing to generate for display the media asset notwithstanding receipt of the suspend command.

3. The method of claim 1, wherein continuing to generate for display the media asset notwithstanding receipt of the suspend command comprises:

comparing the most current event start time to the event start time to compute an event delay amount;

determining whether the event delay amount exceeds an event delay threshold;

in response to determining the event delay amount exceeds the event delay threshold, continuing to generate for display the media asset notwithstanding receipt of the suspend command; and in response to determining the event delay amount does not exceed the event delay threshold, suspending playback of the media asset.

4. The method of claim 1, wherein determining whether the event start time is delayed further comprises:

determining that there is no time difference between the most current event start time and the event start time;

querying the event database as to a plurality of other attendees associated with the next event;

determining a plurality of expected event arrival times associated with the plurality of other attendees associated with the next event;

comparing the plurality of expected event arrival times to the event start time to compute a plurality of expected event delay amounts;

determining whether one or more of the plurality of expected event delay amounts exceeds an event delay threshold; and in response to determining that one or more of the plurality of expected event delay amounts exceeds the event delay threshold, updating the most current event start time based on the plurality of expected event delay amounts.

5. The method of claim 1, further comprising:

in response to determining, based on determining that the most current event start time is later than the event start time, that the event start time is delayed, delaying suspension of playback of the media asset by:

determining a current playback point of the media asset;

computing a most current event start imminence time based on the most current event start time and the imminence threshold;

identifying a suspension time based on the current playback point, the current time, the most current event imminence time, and a plurality of scene end points, by:

analyzing the media asset to determine the plurality of scene end points;

computing a plurality of scene end times based on the current time, the current playback point, and the plurality of scene end points;

determining whether there is at least one scene end time among the plurality of scene end times that occurs before the most current event imminence time;

in response to determining that at least one scene end time among the plurality of scene end times that occurs before the most current event imminence time, identifying, as the suspension time, the scene end time among the plurality of scene end times closest to the most current event imminence time without occurring after the most current event imminence time; and in response to determining there are no scene end times among the plurality of scene end times that occur before the most current event imminence time, identifying, as the suspension time, the most current event imminence time; and scheduling suspension of playback of the media asset to occur at the suspension time.

6. The method of claim 1, further comprising:

in response to determining, based on determining that the most current event start time is later than the event start time, that the event start time is delayed, delaying suspension of playback of the media asset by:

determining a suspension time based on the amount of time before the event start time and the most current event start time; and scheduling the suspension of playback of the media asset to occur at the suspension time.

7. The method of claim 1, wherein determining the next event, based on the calendar information in the profile, from the plurality of entries associated with the user comprises:

obtaining the plurality of entries from the calendar information in the profile;

analyzing the plurality of entries to identify a plurality of meetings;

analyzing the plurality of meetings to obtain a plurality of meeting start times associated with the plurality of meetings; and identifying the next event from the plurality of meetings based on the plurality of meeting start times.

8. The method of claim 1, wherein determining the identity of the event database associated with the next event comprises:

obtaining event metadata associated with the next event;

determining an event database indicator based on the event metadata; and identifying the event database associated with the next event based on the event database indicator.

9. The method of claim 8, wherein querying the event database as to the most current event start time comprises:

obtaining an event identifier from the event metadata;

identifying a remote server associated with the event database;

transmitting a request to the remote server, the request comprising the event identifier and a command requesting the most current event start time from the event database; and receiving, from the remote server, the most current event start time.

10. A system for controlling playback of a media asset on a user equipment based on indicia that a next event is delayed from an event start time, the system comprising:

control circuitry configured to:

receive, during playback of the media asset that has remaining runtime, a suspend command to suspend playback of the media asset;

in response to receipt of the suspend command, determine whether a user is imminently scheduled to attend the next event, wherein the control circuitry is further configured, when determining whether a user is imminently scheduled to attend the next event, to:

retrieve a profile corresponding to the user from a database;

determine the next event, based on calendar information in the profile, from a plurality of entries associated with the user;

determine the event start time of the next event;
compare the event start time of the next event to a current time to compute an amount of time before the event start time; and
determine whether the amount of time is less than an imminence threshold;
in response to determining, based on the amount of time being less than the imminence threshold, that the user is imminently scheduled to attend the next event, determine whether the event start time is delayed, wherein the control circuitry is further configured, when determining whether the event start time is delayed, to:
determine an identity of an event database associated with the next event;
query, using the identity, the event database as to a most current event start time;
compare the most current event start time to the event start time; and
determine, based on the comparing of the most current event start time to the event start time, whether the most current event start time is later than the event start time; and
in response to determining, based on determining that the most current event start time is later than the event start time, that the most current event start time is delayed, continue to generate for display the media asset notwithstanding receipt of the suspend command; wherein the control circuitry is further configured to: determine an event location of the next event; determine a current location of the user; determine an estimated time of arrival based on the event location of the next event and the current location of the user; compare the estimated time of arrival to the most current event start time to compute an early arrival amount; determine whether the early arrival amount exceeds an early arrival threshold; and in response to determining that the early arrival amount exceeds the early arrival threshold, continue to generate for display the media asset notwithstanding receipt of the suspend command.

11. The system of claim 10, wherein the control circuitry is further configured to:
generate for simultaneous display to the user (1) information indicating that the most current event start time is later than the event start time and (2) a selectable option for continuing to generate for display the media asset notwithstanding receipt of the suspend command;
receive a selection from the user of the selectable option; and
in response to receiving the selection from the user of the selectable option, continue to generate for display the media asset notwithstanding receipt of the suspend command.

12. The system of claim 10, wherein the control circuitry is further configured to:
compare the most current event start time to the event start time to compute an event delay amount;
determine whether the event delay amount exceeds an event delay threshold;
in response to determining the event delay amount exceeds the event delay threshold, continue to generate for display the media asset notwithstanding receipt of the suspend command; and
in response to determining the event delay amount does not exceed the event delay threshold, suspend playback of the media asset.

13. The system of claim 10, wherein the control circuitry is further configured, when determining whether the event start time is delayed, to:
determine that there is no time difference between the most current event start time and the event start time;
query the event database as to a plurality of other attendees associated with the next event;
determine a plurality of expected event arrival times associated with the plurality of other attendees associated with the next event;
compare the plurality of expected event arrival times to the event start time to compute a plurality of expected event delay amounts;
determine whether one or more of the plurality of expected event delay amounts exceeds an event delay threshold; and
in response to determining that one or more of the plurality of expected event delay amounts exceeds the event delay threshold, update the most current event start time based on the plurality of expected event delay amounts.

14. The system of claim 10, wherein the control circuitry is further configured to:
in response to determining, based on determining that the most current event start time is later than the event start time, that the event start time is delayed, delay suspension of playback of the media asset, wherein the control circuitry is further configured, when delaying suspension of playback of the media asset, to:
determine a current playback point of the media asset;
compute a most current event start imminence time based on the most current event start time and the imminence threshold;
identify a suspension time based on the current playback point, the current time, the most current event imminence time, and a plurality of scene end points, wherein the control circuitry is further configured, when identifying a suspension time, to:
analyze the media asset to determine the plurality of scene end points;
compute a plurality of scene end times based on the current time, the current playback point, and the plurality of scene end points;
determine whether there is at least one scene end time among the plurality of scene end times that occurs before the most current event imminence time;
in response to determining that at least one scene end time among the plurality of scene end times that occurs before the most current event imminence time, identify, as the suspension time, the scene end time among the plurality of scene end times closest to the most current event imminence time without occurring after the most current event imminence time; and
in response to determining there are no scene end times among the plurality of scene end times that occur before the most current event imminence time, identify, as the suspension time, the most current event imminence time; and
schedule suspension of playback of the media asset to occur at the suspension time.

15. The system of claim 10, wherein the control circuitry is further configured to:
in response to determining, based on determining that the most current event start time is later than the event start time, that the event start time is delayed, delay suspension of playback of the media asset, wherein the control circuitry is further configured, when delaying suspension of playback of the media asset, to:
  determine a suspension time based on the amount of time before the event start time and the most current event start time; and
  schedule the suspension of playback of the media asset to occur at the suspension time.

16. The system of claim 10, wherein the control circuitry is further configured, when determining the next event, based on the calendar information in the profile, from the plurality of entries associated with the user, to:
  obtain the plurality of entries from the calendar information in the profile;
  analyze the plurality of entries to identify a plurality of meetings;
  analyze the plurality of meetings to obtain a plurality of meeting start times associated with the plurality of meetings; and
  identify the next event from the plurality of meetings based on the plurality of meeting start times.

17. The system of claim 10, wherein the control circuitry is further configured, when determining the identity of the event database associated with the next event, to:
  obtain event metadata associated with the next event;
  determine an event database indicator based on the event metadata; and
  identify the event database associated with the next event based on the event database indicator.

18. The system of claim 17, wherein the control circuitry is further configured, when querying the event database as to the most current event start time, to:
  obtain an event identifier from the event metadata;
  identify a remote server associated with the event database;
  transmit a request to the remote server, the request comprising the event identifier and a command requesting the most current event start time from the event database; and
  receive, from the remote server, the most current event start time.

\* \* \* \* \*